US011128565B2

(12) United States Patent
VanBuskirk et al.

(10) Patent No.: US 11,128,565 B2
(45) Date of Patent: *Sep. 21, 2021

(54) OBSERVATION PLATFORM FOR USING STRUCTURED COMMUNICATIONS WITH CLOUD COMPUTING

(71) Applicant: Theatro Labs, Inc., Richardson, TX (US)

(72) Inventors: Guy R. VanBuskirk, Grapevine, TX (US); Steven Paul Russell, Menlo Park, CA (US); Shiva Cheedella, Dallas, TX (US); Jesse Montgomery, Rowlett, TX (US)

(73) Assignee: Theatro Labs, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,841

(22) Filed: Jan. 9, 2020

(65) Prior Publication Data

US 2020/0153729 A1 May 14, 2020

Related U.S. Application Data

(63) Continuation of application No. 16/286,271, filed on Feb. 26, 2019, now Pat. No. 10,536,371, which is a
(Continued)

(51) Int. Cl.
*H04W 4/14* (2009.01)
*H04L 12/721* (2013.01)
(Continued)

(52) U.S. Cl.
CPC ............ *H04L 45/44* (2013.01); *G06Q 30/02* (2013.01); *H04L 67/2804* (2013.01);
(Continued)

(58) Field of Classification Search
CPC .......... H04W 4/02; H04W 4/16; H04W 4/23; H04W 68/005; H04M 9/10; G06F 19/3456; G06Q 10/06398; H04L 65/4076
See application file for complete search history.

(56) References Cited

U.S. PATENT DOCUMENTS 5,712,899 A 1/1998 Pace
6,301,573 B1 10/2001 McIlwaine et al.
(Continued)

FOREIGN PATENT DOCUMENTS

EP 2679041 B1 11/2018
WO 0210926 A1 2/2002

OTHER PUBLICATIONS

Supplementary European Search Report, Application No. 12748969.8, dated Dec. 15, 2016, 7 pages.
(Continued)

*Primary Examiner* — Phuoc H Doan

(57) ABSTRACT

In a method of using structured communications in an observation platform with cloud computing, a signal from a first communication device is received by a second communication device associated with a first computer system. The second computer system forwards the signal from the first computer system to a second computer system, wherein the second computer system is physically remote from the first computer system and connected with the first computer system via a network. The second computer system derives context information for the signal, the deriving based on a plurality of factors derived from an analysis of the signal, wherein the plurality of factors comprises a speech to text analysis of the signal, and wherein the second computer system is cloud based. The second computer system determines at least one destination for the signal based on the plurality of factors for the context information.

23 Claims, 22 Drawing Sheets

Related U.S. Application Data continuation of application No. 15/207,118, filed on Jul. 11, 2016, now Pat. No. 10,257,085, which is a continuation of application No. 13/832,944, filed on Mar. 15, 2013, now Pat. No. 9,407,543, which is a continuation-in-part of application No. 13/401,146, filed on Feb. 21, 2012, now Pat. No. 8,948,730, and a continuation-in-part of application No. 13/665,527, filed on Oct. 31, 2012, now abandoned, and a continuation-in-part of application No. 13/739,504, filed on Jan. 11, 2013, now Pat. No. 10,204,524.

(60) Provisional application No. 61/445,504, filed on Feb. 22, 2011, provisional application No. 61/487,432, filed on May 18, 2011.

(51) Int. Cl.
  *G06Q 30/02* (2012.01)
  *H04L 29/08* (2006.01)
  *H04W 4/02* (2018.01)

(52) U.S. Cl.
  CPC ............. *H04W 4/02* (2013.01); *H04W 4/025* (2013.01); *H04M 2203/2038* (2013.01)

(56) References Cited

U.S. PATENT DOCUMENTS

| | | |
|---|---|---|
| 6,377,927 B1 | 4/2002 | Loghmani et al. |
| 6,618,734 B1 | 9/2003 | Williams et al. |
| 6,928,343 B2 | 8/2005 | Cato |
| 6,937,988 B1 | 8/2005 | Hemkumar et al. |
| 6,937,998 B1 | 8/2005 | McGlynn et al. |
| 6,996,531 B2 | 2/2006 | Korall et al. |
| 7,058,208 B2 | 6/2006 | Chang et al. |
| 7,248,881 B2 | 7/2007 | Shostak |
| 7,397,368 B2 | 7/2008 | Otto et al. |
| 7,656,295 B2 | 2/2010 | Robson et al. |
| 7,748,618 B2 | 7/2010 | Vawter |
| 7,925,777 B2 | 4/2011 | Levett |
| 8,055,296 B1 | 11/2011 | Persson et al. |
| 8,060,412 B2 | 11/2011 | Rosenbaum et al. |
| 8,140,340 B2 | 3/2012 | Bhogal et al. |
| 8,174,359 B1 | 5/2012 | Veni |
| 8,179,872 B2 | 5/2012 | Bienfait et al. |
| 8,180,377 B2 | 5/2012 | Yang et al. |
| 8,183,996 B2 | 5/2012 | Toyokawa et al. |
| 8,200,480 B2 | 6/2012 | Shectman et al. |
| 8,271,188 B2 | 9/2012 | De Koning |
| 8,352,260 B2 | 1/2013 | Sung et al. |
| 8,369,505 B2 | 2/2013 | Vuong |
| 8,473,289 B2 | 6/2013 | Jitkoff et al. |
| 8,630,851 B1 | 1/2014 | Hertschuh et al. |
| 8,699,694 B2 | 4/2014 | Chishti et al. |
| 8,798,036 B2 | 8/2014 | Küt et al. |
| 8,948,730 B2 | 2/2015 | Vanbuskirk et al. |
| 9,042,921 B2 | 5/2015 | Karmarkar |
| 9,053,449 B2 | 6/2015 | Kumar et al. |
| 9,271,118 B2 | 2/2016 | Vanbuskirk et al. |
| 9,305,554 B2 | 4/2016 | Jagatheesan et al. |
| 9,311,466 B2 | 4/2016 | Headley |
| 9,349,128 B1 | 5/2016 | Kerr et al. |
| 9,407,543 B2 | 8/2016 | Russell et al. |
| 9,414,195 B2 | 8/2016 | Russell et al. |
| 9,445,232 B2 | 9/2016 | Russell et al. |
| 9,501,951 B2 | 11/2016 | Russell |
| 9,514,656 B2 | 12/2016 | Russell |
| 9,542,695 B2 | 1/2017 | Russell |
| 9,602,625 B2 | 3/2017 | Russell et al. |
| 9,686,732 B2 | 6/2017 | Russell et al. |
| 9,691,047 B2 | 6/2017 | Russell et al. |
| 9,928,529 B2 | 3/2018 | Russell et al. |
| 9,971,983 B2 | 5/2018 | Russell et al. |
| 9,971,984 B2 | 5/2018 | Russell et al. |
| 10,069,781 B2 | 9/2018 | Kumar et al. |
| 10,134,001 B2 | 11/2018 | Todd et al. |
| 10,204,524 B2 | 2/2019 | Russell et al. |
| 10,257,085 B2 | 4/2019 | Russel et al. |
| 10,304,094 B2 | 5/2019 | Russell et al. |
| 10,313,289 B2 | 6/2019 | Kumar et al. |
| 10,375,133 B2 | 8/2019 | Vanbuskirk et al. |
| 10,558,938 B2 | 2/2020 | Todd et al. |
| 10,574,784 B2 | 2/2020 | Russell et al. |
| 10,699,313 B2 | 6/2020 | Russell et al. |
| 2002/0055866 A1 | 5/2002 | Dewar |
| 2002/0136383 A1 | 9/2002 | Contreras |
| 2002/0143548 A1 | 10/2002 | Korall et al. |
| 2003/0065805 A1 | 4/2003 | Barnes |
| 2003/0130893 A1 | 7/2003 | Farmer |
| 2003/0236086 A1 | 12/2003 | Litwin |
| 2004/0203989 A1 | 10/2004 | Karaoguz |
| 2005/0021838 A1 | 1/2005 | Levett |
| 2005/0060236 A1 | 3/2005 | Iulo |
| 2005/0190772 A1 | 9/2005 | Tsai et al. |
| 2005/0213518 A1 | 9/2005 | Afiya et al. |
| 2005/0221264 A1 | 10/2005 | Hearn et al. |
| 2006/0071775 A1 | 4/2006 | Otto et al. |
| 2006/0095317 A1 | 5/2006 | Brown et al. |
| 2006/0248011 A1 | 11/2006 | Hecht-Nielsen et al. |
| 2007/0046458 A1 | 3/2007 | Toyokawa et al. |
| 2007/0064913 A1 | 3/2007 | Shaffer et al. |
| 2007/0129061 A1 | 6/2007 | Ringland et al. |
| 2007/0207789 A1 | 9/2007 | Zellner et al. |
| 2008/0040431 A1 | 2/2008 | Bleeker et al. |
| 2008/0041937 A1 | 2/2008 | Vawter |
| 2008/0154612 A1 | 6/2008 | Evermann et al. |
| 2008/0159271 A1 | 7/2008 | Kutt et al. |
| 2008/0240384 A1 | 10/2008 | Suryanarayana et al. |
| 2008/0242319 A1 | 10/2008 | Paschetto et al. |
| 2008/0270249 A1 | 10/2008 | Rosenbaum et al. |
| 2008/0279133 A1 | 11/2008 | Bienfait et al. |
| 2009/0003309 A1 | 1/2009 | Bawcutt et al. |
| 2009/0005972 A1 | 1/2009 | De Koning |
| 2009/0012793 A1 | 1/2009 | Dao et al. |
| 2009/0176510 A1 | 7/2009 | Routtenberg |
| 2009/0234655 A1 | 9/2009 | Kwon |
| 2009/0249432 A1 | 10/2009 | O'Sullivan et al. |
| 2009/0254667 A1 | 10/2009 | Li et al. |
| 2010/0003659 A1 | 1/2010 | Edmonds |
| 2010/0009698 A1 | 1/2010 | Yang et al. |
| 2010/0054526 A1* | 3/2010 | Eckles ............... H04N 7/147 382/100 |
| 2010/0070268 A1 | 3/2010 | Sung et al. |
| 2010/0088749 A1 | 4/2010 | Steeples |
| 2010/0094707 A1 | 4/2010 | Freer |
| 2010/0113062 A1 | 5/2010 | Lee et al. |
| 2010/0325207 A1 | 12/2010 | Churchill et al. |
| 2011/0022642 A1 | 1/2011 | Demilo et al. |
| 2011/0055207 A1 | 3/2011 | Schorzman et al. |
| 2011/0072154 A1 | 3/2011 | Bogdanovic et al. |
| 2011/0077989 A1 | 3/2011 | Akred et al. |
| 2011/0093818 A1* | 4/2011 | Sathish ............... G06F 21/6281 715/853 |
| 2011/0171935 A1 | 7/2011 | Kamal |
| 2011/0179180 A1 | 7/2011 | Schleifer et al. |
| 2011/0201356 A1 | 8/2011 | George et al. |
| 2011/0202466 A1 | 8/2011 | Carter |
| 2011/0205053 A1 | 8/2011 | Chen et al. |
| 2011/0255680 A1 | 10/2011 | Vuong |
| 2012/0034590 A1 | 2/2012 | Hallsten et al. |
| 2012/0089617 A1 | 4/2012 | Frey |
| 2012/0123890 A1 | 5/2012 | Nathan |
| 2012/0151380 A1 | 6/2012 | Bishop |
| 2012/0226757 A1 | 9/2012 | McFarland et al. |
| 2012/0310980 A1 | 12/2012 | Hepper |
| 2013/0040600 A1 | 2/2013 | Reitnour et al. |
| 2013/0060568 A1 | 3/2013 | Russell et al. |
| 2013/0073388 A1 | 3/2013 | Heath |
| 2013/0117824 A1 | 5/2013 | Naslund et al. |
| 2013/0130207 A1 | 5/2013 | Russell et al. |
| 2013/0196706 A1 | 8/2013 | Patel et al. |
| 2013/0196906 A1 | 8/2013 | Eliasof |
| 2013/0204972 A1 | 8/2013 | Russell et al. |

(56) References Cited

U.S. PATENT DOCUMENTS

| | | |
|---|---|---|
| 2013/0204998 A1 | 8/2013 | Russell et al. |
| 2013/0317944 A1 | 11/2013 | Huang et al. |
| 2014/0052676 A1 | 2/2014 | Wagner et al. |
| 2014/0143354 A1 | 5/2014 | Tiernan |
| 2014/0148210 A1 | 5/2014 | Kundu et al. |
| 2014/0316779 A1 | 10/2014 | Russell et al. |
| 2014/0316898 A1 | 10/2014 | Russell et al. |
| 2015/0065149 A1 | 3/2015 | Russell et al. |
| 2015/0100433 A1 | 4/2015 | Choy et al. |
| 2015/0105061 A1 | 4/2015 | Russell et al. |
| 2015/0106167 A1 | 4/2015 | Russell et al. |
| 2015/0113098 A1 | 4/2015 | Vanbuskirk et al. |
| 2015/0213382 A1 | 7/2015 | Russell et al. |
| 2015/0256873 A1 | 9/2015 | Klein et al. |
| 2015/0269869 A1 | 9/2015 | Russell et al. |
| 2016/0012471 A1 | 1/2016 | Fisher et al. |
| 2016/0171432 A1 | 6/2016 | Pugh et al. |
| 2016/0225045 A1 | 8/2016 | Cumberland et al. |
| 2016/0321595 A1 | 11/2016 | Russell et al. |
| 2016/0321596 A1 | 11/2016 | Russell et al. |
| 2016/0321611 A1 | 11/2016 | Russell et al. |
| 2016/0323181 A1 | 11/2016 | Russell et al. |
| 2016/0364790 A1 | 12/2016 | Lanpher et al. |
| 2017/0011449 A1 | 1/2017 | Mueller et al. |
| 2017/0024804 A1 | 1/2017 | Tepfenhart et al. |
| 2017/0039512 A1 | 2/2017 | Jones et al. |
| 2017/0091837 A1 | 3/2017 | Russell et al. |
| 2017/0093952 A1 | 3/2017 | Kumar et al. |
| 2017/0187826 A1 | 6/2017 | Russell et al. |
| 2017/0213178 A1 | 7/2017 | Todd et al. |
| 2018/0013698 A1 | 1/2018 | Vendrow et al. |
| 2018/0189844 A1 | 7/2018 | Russell et al. |
| 2018/0191817 A1 | 7/2018 | Richardson et al. |
| 2018/0260758 A1 | 9/2018 | Russell et al. |
| 2018/0375810 A1 | 12/2018 | Kumar et al. |
| 2019/0130336 A1 | 5/2019 | Todd et al. |
| 2019/0156688 A1 | 5/2019 | Russell et al. |
| 2019/0207894 A1 | 7/2019 | Kumar et al. |
| 2019/0311409 A1 | 10/2019 | Russell et al. |
| 2019/0349412 A1 | 11/2019 | Vanbuskirk et al. |
| 2020/0153729 A1 | 5/2020 | Vanbuskirk et al. |
| 2020/0175454 A1 | 6/2020 | Todd et al. |
| 2020/0195750 A1 | 6/2020 | Russell et al. |
| 2020/0210927 A1 | 7/2020 | Russell et al. |
| 2020/0302493 A1 | 9/2020 | Russell et al. |
| 2021/0006610 A1 | 1/2021 | Vanbuskirk et al. |

OTHER PUBLICATIONS

"European Search Report, Application No. 14160323.3", dated Jun. 18, 2014, 6 pages.

"International Search Report, PCT/2012/025984", dated Dec. 22, 2012, 9 pages.

"What is Cloud Networking or Cloud Based Networking?", SDxCentral, www.sdxcentral.com/cloud/definitions/all-about-cloud-networking/, 2017, 2 pgs.

Arbanowski, "I-centric Communications: Personalization, Ambient Awareness and Adaptability for Future Mobile Services", IEEE Communications Magazine, Sep. 2004, 7 pages.

Rao, "Geographic Routing without Location Information", 9th Annual International Conference on Mobile Computing and Networking, Sep. 2003, 13 pages.

\* cited by examiner

Process
300

A SIGNAL FROM A FIRST COMMUNICATION DEVICE IS RECEIVED AT A SECOND COMMUNICATION DEVICE ASSOCIATED WITH A COMPUTER SYSTEM, WHEREIN A FIRST CHARACTERISTIC OF THE SIGNAL CORRESPONDS TO AN AUDIBLE SOURCE AND A SECOND CHARACTERISTIC OF THE SIGNAL CORRESPONDS TO INFORMATION INDICATIVE OF A GEOGRAPHIC POSITION OF THE FIRST COMMUNICATION DEVICE
302

A FIRST USER ASSOCIATED WITH THE FIRST COMMUNICATION DEVICE IS RECOGNIZED AT THE COMPUTER SYSTEM
304

CONTEXT INFORMATION FOR THE SIGNAL IS DERIVED THE COMPUTER SYSTEM ASSOCIATED WITH THE SECOND COMMUNICATION DEVICE
306

GEOGRAPHIC LOCATION DATA FROM THE FIRST COMMUNICATION DEVICE IS RECEIVED AT THE COMPUTER SYSTEM GENERATED BY A GEOGRAPHIC POSITION COMPONENT ASSOCIATED WITH THE FIRST COMMUNICATION DEVICE
308

A COPY OF AT LEAST ONE CHARACTERISTIC OF THE SIGNAL IS STORED IN A STORAGE MEDIUM AND MADE AVAILABLE FOR PERFORMANCE METRIC ANALYSIS
310

INSTRUCTIONS ARE RECEIVED AT THE COMPUTER SYSTEM COMPRISING RULES FOR THE RELAYING THE SIGNAL TO THE DESTINATION DERIVED FROM THE CONTEXT INFORMATION
312

THE SIGNAL IS RELAYED TO A DESTINATION DERIVED FROM THE CONTEXT INFORMATION
314

A VISUAL REPRESENTATION IS GENERATED INDICATING THE GEOGRAPHIC POSITION OF THE FIRST COMMUNICATION DEVICE WITH RESPECT TO A GEOGRAPHIC ENVIRONMENT IN WHICH THE FIRST COMMUNICATION DEVICE IS LOCATED
316

Fig. 3

Process
400

A SIGNAL FROM A FIRST COMMUNICATION DEVICE IS RECEIVED AT A SECOND COMMUNICATION DEVICE, WHEREIN A FIRST CHARACTERISTIC OF THE SIGNAL CORRESPONDS TO A VOICE OF A FIRST USER AND A SECOND CHARACTERISTIC OF THE SIGNAL CORRESPONDS TO INFORMATION INDICATIVE OF A GEOGRAPHIC POSITION OF THE FIRST COMMUNICATION DEVICE
402

THE FIRST USER ASSOCIATED WITH THE FIRST COMMUNICATION DEVICE IS RECOGNIZED
404

TEXT RELATED TO THE VOICE OF THE FIRST USER IS RECOGNIZED
406

CONTEXT INFORMATION FROM THE TEXT IS DERIVED AT A COMPUTER SYSTEM ASSOCIATED WITH THE SECOND COMMUNICATION DEVICE, WHEREIN THE CONTEXT INFORMATION CORRESPONDS TO A COMMAND RELATED TO THE TEXT
408

THE TEXT IS STORED IN A STORAGE MEDIUM FOR DEVELOPING KEY PERFORMANCE METRICS
410

THE SIGNAL IS RELAYED TO A DESTINATION DERIVED FROM THE CONTEXT INFORMATION
412

Fig. 4

Process
500

A FIRST USER ASSOCIATED WITH A FIRST COMMUNICATION DEVICE AND A SECOND USER ASSOCIATED WITH A SECOND COMMUNICATION DEVICE ARE RECOGNIZED AT A CENTRAL COMPUTER SYSTEM
502

GEOGRAPHIC LOCATIONS OF THE FIRST COMMUNICATION DEVICE AND THE SECOND COMMUNICATION DEVICE ARE TRACKED AT THE CENTRAL COMPUTER SYSTEM
504

A COMMUNICATION BETWEEN THE FIRST COMMUNICATION DEVICE AND THE SECOND COMMUNICATION DEVICE ARE TRACKED AND RECORDED AT THE CENTRAL COMPUTER SYSTEM, WHEREIN AT LEAST A PORTION OF THE COMMUNICATION IS AN AUDIBLE COMMUNICATION
506

FEATURES OF THE COMMUNICATION ARE IDENTIFIED AT THE CENTRAL COMPUTER SYSTEM
508

THE FEATURES ARE MADE AVAILABLE
510

Fig. 5

Process
600

A GROUP OF USERS IS RECOGNIZED, AT A COMPUTER SYSTEM, WHEREIN EACH USER OF THE GROUP OF USERS ARE ASSOCIATED WITH COMMUNICATION DEVICES
602

A COMMUNICATION BETWEEN THE COMMUNICATION DEVICES IS RECORDED AT THE COMPUTER SYSTEM, WHEREIN AT LEAST A PORTION OF THE COMMUNICATION IS AN AUDIBLE COMMUNICATION
604

GEOGRAPHIC LOCATIONS OF THE COMMUNICATION DEVICES ARE RECORDED AT THE COMPUTER SYSTEM
606

FEATURES ARE IDENTIFIED BASED UPON THE COMMUNICATION
608

A VISUAL REPRESENTATION OF THE FEATURES IS GENERATED AT THE COMPUTER SYSTEM
610

THE VISUAL REPRESENTATION IS MADE AVAILABLE TO A MANAGER FOR MAKING A DECISION
612

Fig. 6

Process
700

A SIGNAL IN A FIRST OBSERVATION PLATFORM IS RECEIVED FROM A FIRST COMMUNICATION DEVICE AT A SECOND COMMUNICATION DEVICE ASSOCIATED WITH A COMPUTER SYSTEM WHEREIN A FIRST CHARACTERISTIC OF THE SIGNAL CORRESPONDS TO AN AUDIBLE SOURCE AND A SECOND CHARACTERISTIC OF THE SIGNAL CORRESPONDS TO INFORMATION INDICATIVE OF A GEOGRAPHIC POSITION OF THE FIRST COMMUNICATION DEVICE, AND WHEREIN THE SECOND OBSERVATION PLATFORM IS ASSOCIATED WITH A RADIO RANGE
702

A FIRST USER ASSOCIATED WITH THE FIRST COMMUNICATION DEVICE IS RECOGNIZED AT THE COMPUTER SYSTEM
704

CONTEXT INFORMATION FOR THE SIGNAL IS DERIVED THE COMPUTER SYSTEM ASSOCIATED WITH THE SECOND COMMUNICATION DEVICE
706

THE SIGNAL IS RELAYED FROM THE COMPUTER SYSTEM TO A SECOND COMPUTER SYSTEM ASSOCIATED WITH A SECOND OBSERVATION PLATFORM
708

THE SIGNAL IS RELAYED TO A DESTINATION IN THE SECOND OBSERVATION PLATFORM VIA THE SECOND COMPUTER SYSTEM DERIVED FROM THE CONTEXT INFORMATION
710

Fig. 7

Process
1000

A SIGNAL IS RECEIVED FROM A FIRST COMMUNICATION DEVICE AT A SECOND COMMUNICATION DEVICE ASSOCIATED WITH A COMPUTER SYSTEM, WHEREIN THE COMPUTER SYSTEM IS ASSOCIATED WITH A ORGANIZATION, WHEREIN A FIRST CHARACTERISTIC OF THE SIGNAL CORRESPONDS TO AN AUDIBLE SOURCE AND A SECOND CHARACTERISTIC OF THE SIGNAL CORRESPONDS TO INFORMATION INDICATIVE OF A GEOGRAPHIC POSITION OF THE FIRST COMMUNICATION DEVICE.
1002

A USER IS IDENTIFIED AS ASSOCIATED WITH THE FIRST COMMUNICATION DEVICE AT THE COMPUTER SYSTEM.
1004

A QUERY IS DERIVED FROM THE SIGNAL RELATED TO THE ORGANIZATION, AT THE COMPUTER SYSTEM.
1006

A PLURALITY OF PERSONS REPRESENTING THE ORGANIZATION ARE DETERMINED TO RESPOND TO THE QUERY, WHEREIN THE DETERMINING IS BASED ON A FACTOR RELATED TO THE PLURALITY OF PERSONS REPRESENTING THE ORGANIZATION.
1008

THE SIGNAL IS FORWARDED TO A PLURALITY OF COMMUNICATION DEVICES ASSOCIATED WITH THE PLURALITY OF PERSONS REPRESENTING THE ORGANIZATION.
1010

A RESPONSE IS RECEIVED FROM A COMMUNICATION DEVICE ASSOCIATED WITH ONE OF THE PLURALITY OF PERSONS REPRESENTING THE ORGANIZATION AT THE SECOND COMMUNICATION DEVICE.
1012

THE RESPONSE IS FORWARDED FROM THE SECOND COMMUNICATION DEVICE TO THE FIRST COMMUNICATION DEVICE.
1014

A COMMUNICATION CHANNEL IS OPENED BETWEEN THE FIRST COMMUNICATION DEVICE AND THE COMMUNICATION DEVICE ASSOCIATED WITH ONE OF THE PLURALITY OF PERSONS.
1016

Fig. 10

Process
1100

```
┌─────────────────────────────────────────────────────────────────────┐
│ A SIGNAL IS RECEIVED FROM A FIRST COMMUNICATION DEVICE AT A SECOND  │
│ COMMUNICATION DEVICE ASSOCIATED WITH A COMPUTER SYSTEM, WHEREIN THE │
│ COMPUTER SYSTEM IS ASSOCIATED WITH A ORGANIZATION, WHEREIN A FIRST  │
│ CHARACTERISTIC OF THE SIGNAL CORRESPONDS TO INFORMATION INDICATIVE  │
│ OF A GEOGRAPHIC POSITION OF THE FIRST COMMUNICATION DEVICE.         │
│                              1102                                   │
└─────────────────────────────────────────────────────────────────────┘
                                  │
                                  ▼
┌─────────────────────────────────────────────────────────────────────┐
│   A USER IS IDENTIFIED AS ASSOCIATED WITH THE FIRST COMMUNICATION   │
│                  DEVICE AT THE COMPUTER SYSTEM.                     │
│                              1104                                   │
└─────────────────────────────────────────────────────────────────────┘
                                  │
                                  ▼
┌─────────────────────────────────────────────────────────────────────┐
│  A HISTORY OF ACTIVITIES OF THE USER ASSOCIATED WITH THE            │
│                  ORGANIZATION IS ACCESSED.                          │
│                              1106                                   │
└─────────────────────────────────────────────────────────────────────┘
                                  │
                                  ▼
┌─────────────────────────────────────────────────────────────────────┐
│  A GEOGRAPHIC LOCATION OF THE FIRST COMMUNICATION DEVICE IN THE     │
│      ORGANIZATION IS DERIVED AT THE COMPUTER SYSTEM.                │
│                              1108                                   │
└─────────────────────────────────────────────────────────────────────┘
                                  │
                                  ▼
┌─────────────────────────────────────────────────────────────────────┐
│ A NOTIFICATION IS SENT TO THE FIRST COMMUNICATION DEVICE WHEREIN THE│
│ NOTIFICATION IS BASED ON THE HISTORY OF ACTIVITY AND THE GEOGRAPHIC │
│         LOCATION OF THE FIRST COMMUNICATION DEVICE.                 │
│                              1110                                   │
└─────────────────────────────────────────────────────────────────────┘
                                  │
                                  ▼
┌─────────────────────────────────────────────────────────────────────┐
│ AT LEAST A PORTION OF THE HISTORY OF ACTIVITIES IS DELIVERED TO THE │
│                  FIRST COMMUNICATION DEVICE.                        │
│                              1112                                   │
└─────────────────────────────────────────────────────────────────────┘
```

Fig. 11

Process
1200

A SIGNAL IS RECEIVED FROM A FIRST COMMUNICATION DEVICE AT A SECOND COMMUNICATION DEVICE ASSOCIATED WITH A COMPUTER SYSTEM, WHEREIN THE SIGNAL COMPRISES A MANDATORY MESSAGE FOR A THIRD COMMUNICATION DEVICE.
1202

THE SIGNAL IS FORWARDED WITH THE MANDATORY MESSAGE TO THE THIRD COMMUNICATION DEVICE ASSOCIATED WITH A USER SUCH THAT A RECEIPT OF THE MANDATORY MESSAGE AT THE THIRD COMMUNICATION DEVICE WILL LOCK FEATURES OF THE THIRD COMMUNICATION DEVICE UNTIL THE MANDATORY MESSAGE HAS BEEN ACKNOWLEDGED BY THE USER.
1204

AN ACKNOWLEDGEMENT OF THE MANDATORY MESSAGE IS RECEIVED FROM THE THIRD COMMUNICATION DEVICE AT THE SECOND COMMUNICATION DEVICE.
1206

THE ACKNOWLEDGEMENT OF THE MANDATORY MESSAGE IS FORWARDED FROM THE SECOND COMMUNICATION DEVICE TO THE FIRST COMMUNICATION DEVICE.
1208

THE SIGNAL WITH THE MANDATORY MESSAGE IS FORWARDED TO A PLURALITY OF COMMUNICATION DEVICES ASSOCIATED WITH A PLURALITY OF USERS SUCH THAT A RECEIPT OF THE MANDATORY MESSAGE AT EACH OF THE PLURALITY OF COMMUNICATION DEVICES WILL LOCK FEATURES OF EACH OF THE PLURALITY OF COMMUNICATION DEVICES UNTIL THE MANDATORY MESSAGE HAS BEEN ACKNOWLEDGED BY EACH OF THE PLURALITY OF USERS.
1210

A CHARACTERISTIC OF THE FORWARDING THE SIGNAL WITH THE MANDATORY MESSAGE IS TRACKED.
1212

Fig. 12

Process
1300

A SIGNAL IS RECEIVED FROM A FIRST COMMUNICATION DEVICE AT A SECOND COMMUNICATION DEVICE ASSOCIATED WITH A COMPUTER SYSTEM, WHEREIN A FIRST CHARACTERISTIC OF THE SIGNAL CORRESPONDS TO SUPPLEMENTAL INFORMATION USEFUL FOR THE INSTRUCTION AND THE TRAINING
1302

A USER ASSOCIATED WITH THE FIRST COMMUNICATION DEVICE IS IDENTIFIED AT THE COMPUTER SYSTEM.
1304

A STATUS OF THE USER IS DETERMINED WHEREIN THE STATUS COMPRISES A READINESS OF THE USER, AT THE COMPUTER SYSTEM, BASED ON THE SUPPLEMENTAL INFORMATION AND INFORMATION SENT FROM THE FIRST COMMUNICATION DEVICE TO THE SECOND COMMUNICATION DEVICE
1306

INSTRUCTIONAL INFORMATION IS SENT TO THE FIRST COMMUNICATION DEVICE IN RESPONSE TO A DETERMINATION THAT THE STATUS OF THE USER INDICATES A LIKELIHOOD OF READINESS TO RECEIVE THE INSTRUCTIONAL INFORMATION, WHEREIN THE INSTRUCTIONAL INFORMATION IS FOR USE BY THE USER IN CONJUNCTION WITH THE FIRST COMMUNICATION DEVICE
1308

THE COMPUTER SYSTEM TRACKING A USE OF THE INSTRUCTIONAL INFORMATION IN CONJUNCTION WITH THE FIRST COMMUNICATION DEVICE.
1310

Fig. 13

Process
1400

AT LEAST ONE SIGNAL OF A PLURALITY OF COMMUNICATION SIGNALS IS MONITORED VIA A COMPUTER SYSTEM BETWEEN A FIRST COMMUNICATION DEVICE AND A SECOND COMMUNICATION DEVICE WHEREIN A FIRST CHARACTERISTIC OF THE AT LEAST ONE SIGNAL CORRESPONDS TO AN AUDIBLE SOURCE AND A SECOND CHARACTERISTIC OF THE AT LEAST ONE SIGNAL CORRESPONDS TO INFORMATION INDICATIVE OF A GEOGRAPHIC POSITION OF THE FIRST COMMUNICATION DEVICE.
1402

A DETERMINATION IS MADE THAT A USER ASSOCIATED WITH THE FIRST COMMUNICATION DEVICE IS EXPERIENCING AN ISSUE WITH A FEATURE OF THE FIRST COMMUNICATION DEVICE.
1404

AN INVITATION FOR A TRAINING MODULE IS SENT FROM THE COMPUTER SYSTEM TO THE FIRST COMMUNICATION DEVICE, WHEREIN THE TRAINING MODULE IS FOR USE BY THE USER IN CONJUNCTION WITH THE FIRST COMMUNICATION DEVICE.
1406

THE TRAINING MODULE IS SENT TO THE FIRST COMMUNICATION DEVICE IN RESPONSE TO RECEIVING AN ACCEPTANCE OF THE INVITATION.
1408

Fig. 14

Process
1500

AT LEAST ONE SIGNAL OF A PLURALITY OF COMMUNICATION SIGNALS IS MONITORED VIA A COMPUTER SYSTEM BETWEEN A FIRST COMMUNICATION DEVICE AND A SECOND COMMUNICATION DEVICE WHEREIN A FIRST CHARACTERISTIC OF THE AT LEAST ONE SIGNAL CORRESPONDS TO AN AUDIBLE SOURCE AND A SECOND CHARACTERISTIC OF THE AT LEAST ONE SIGNAL CORRESPONDS TO INFORMATION INDICATIVE OF A GEOGRAPHIC POSITION OF THE FIRST COMMUNICATION DEVICE.
1502

CLASSIFICATIONS FOR DATA ASSOCIATED WITH THE AT LEAST ONE SIGNAL ARE IDENTIFIED.
1504

THE DATA AND THE CLASSIFICATIONS FOR THE DATA ARE STORED IN A DATABASE.
1506

A REQUEST IS RECEIVED, AT THE COMPUTER SYSTEM, FOR A REPORT BASED ON THE PLURALITY OF COMMUNICATION SIGNALS.
1508

THE REPORT IS GENERATED BASED THE DATA AND THE CLASSIFICATIONS.
1510

Fig. 15

Process
1600

AT LEAST ONE SIGNAL OF A PLURALITY OF COMMUNICATION SIGNALS IS MONITORED VIA A COMPUTER SYSTEM BETWEEN A FIRST COMMUNICATION DEVICE AND A SECOND COMMUNICATION DEVICE WHEREIN A FIRST CHARACTERISTIC OF THE AT LEAST ONE SIGNAL CORRESPONDS TO AN AUDIBLE SOURCE AND A SECOND CHARACTERISTIC OF THE AT LEAST ONE SIGNAL CORRESPONDS TO INFORMATION INDICATIVE OF A GEOGRAPHIC POSITION OF THE FIRST COMMUNICATION DEVICE.
1602

THE AUDIBLE SOURCE OF THE AT LEAST ONE SIGNAL IS CONVERTED TO TEXT.
1604

THE TEXT IS STORED IN A DATABASE
1606

A REQUEST IS RECEIVED, AT THE COMPUTER SYSTEM, FOR A REPORT BASED ON THE PLURALITY OF COMMUNICATION SIGNALS; AND
1608

THE REPORT IS GENERATED BASED ON THE TEXT.
1610

Fig. 16

Process
1700

A SIGNAL IS RECEIVED FROM A FIRST COMMUNICATION DEVICE AT A SECOND COMMUNICATION DEVICE ASSOCIATED WITH A FIRST COMPUTER SYSTEM.
1702

THE SIGNAL IS FORWARDED FROM THE FIRST COMPUTER SYSTEM TO A SECOND COMPUTER SYSTEM, WHEREIN THE SECOND COMPUTER SYSTEM IS PHYSICALLY REMOTE FROM THE FIRST COMPUTER SYSTEM AND CONNECTED VIA A NETWORK.
1704

CONTEXT INFORMATION IS DERIVED FOR THE SIGNAL AND AT LEAST ONE DESTINATION FOR THE SIGNAL BASED ON THE CONTEXT INFORMATION AT THE SECOND COMPUTER SYSTEM.
1706

THE CONTEXT INFORMATION AND THE AT LEAST ONE DESTINATION FOR THE SIGNAL ARE RECEIVED AT THE FIRST COMPUTER SYSTEM.
1708

THE SIGNAL IS RELAYED TO THE AT LEAST ONE DESTINATION VIA THE FIRST COMPUTER SYSTEM AND THE SECOND COMMUNICATION DEVICE.
1710

Fig. 17

Process
1800

A SIGNAL IS RECEIVED FROM A FIRST COMMUNICATION DEVICE AT A SECOND COMMUNICATION DEVICE ASSOCIATED WITH A COMPUTER SYSTEM, WHEREIN THE SIGNAL IS A REQUEST FOR TECHNICAL SUPPORT.
1802

THE REQUEST FOR THE TECHNICAL SUPPORT IS DERIVED FROM THE SIGNAL AT THE COMPUTER SYSTEM.
1804

THE SIGNAL IS RELAYED TO A TECHNICAL SUPPORT DESTINATION VIA THE COMPUTER SYSTEM AND THE SECOND COMMUNICATION DEVICE.
1806

Fig. 18

OBSERVATION PLATFORM FOR USING STRUCTURED COMMUNICATIONS WITH CLOUD COMPUTING

CROSS-REFERENCE TO RELATED APPLICATIONS

This application is a continuation of and claims the benefit of co-pending U.S. patent application Ser. No. 16/286,271, filed on Feb. 26, 2019, entitled "OBSERVATION PLATFORM FOR USING STRUCTURED COMMUNICATIONS WITH CLOUD COMPUTING," by Russell, et al., assigned to the assignee of the present application. Application Ser. No. 16/286,271 is herein incorporated by reference in its entirety.

The application with Ser. No. 16/286,271 is a continuation of and claims the benefit of then co-pending U.S. patent application Ser. No. 15/207,118, filed on Jul. 11, 2016, entitled "OBSERVATION PLATFORM FOR USING STRUCTURED COMMUNICATIONS WITH CLOUD COMPUTING," by Russell, et al., assigned to the assignee of the present application. Application Ser. No. 15/207,118 is herein incorporated by reference in its entirety.

The application with Ser. No. 15/207,118 is a continuation of and claims the benefit of then co-pending U.S. patent application Ser. No. 13/832,944, filed on Mar. 15, 2013, entitled "OBSERVATION PLATFORM FOR USING STRUCTURED COMMUNICATIONS WITH CLOUD COMPUTING," by Russell, et al., assigned to the assignee of the present application. Application Ser. No. 13/832,944 is herein incorporated by reference in its entirety.

The application with Ser. No. 13/832,944 is a continuation-in-part application of and claims the benefit of then co-pending U.S. patent application Ser. No. 13/401,146, filed on Feb. 21, 2012, entitled "OBSERVATION PLATFORM FOR USING STRUCTURED COMMUNICATIONS," by Russell, et al., assigned to the assignee of the present application and is herein incorporated by reference in its entirety.

The application with Ser. No. 13/401,146 claims priority to the provisional U.S. Patent Application No. 61/445,504, filed on Feb. 22, 2011, entitled "ENABLING A RETAIL SALES/SERVICE PROVIDER TO INTERACT WITH ON-PREMISE CUSTOMERS," by Russell, et al., which is herein incorporated by reference in its entirety. The application with Ser. No. 13/401,146 also claims priority to the provisional U.S. Patent Application No. 61/487,432, Filed on May 18, 2011, entitled "ACTIVITY COORDINATING ASSOCIATE'S AUTOMATIC SERVICE ASSISTANT," by Russell, et al., which is herein incorporated by reference in its entirety.

The application with Ser. No. 15/207,118 is also a continuation-in-part application of and claims the benefit of co-pending U.S. patent application Ser. No. 13/665,527, filed on Oct. 31, 2012, entitled "OBSERVATION PLATFORM FOR PERFORMING STRUCTURED COMMUNICATIONS," by Russell, et al., assigned to the assignee of the present application and is herein incorporated by reference in its entirety.

The application with Ser. No. 15/207,118 is also a continuation-in-part application of and claims the benefit of co-pending U.S. patent application Ser. No. 13/739,504, filed on Jan. 11, 2013, entitled "OBSERVATION PLATFORM FOR TRAINING, MONITORING, AND MINING STRUCTURED COMMUNICATIONS," by Russell, et al., assigned to the assignee of the present application and is herein incorporated by reference in its entirety.

The present patent application is also related to U.S. patent application Ser. No. 13/833,572, filed Mar. 15, 2013, entitled "MEDIATING A COMMUNICATION IN AN OBSERVATION PLATFORM", by Russell, et al, assigned to the assignee of the present invention, and which is incorporated by reference in its entirety herein.

BACKGROUND

Retailers are under constant pressure to cut costs, improve margins, and increase floor traffic and customer satisfaction. This has always been so, but the rise of the internet, available at home and while mobile, has increased the pressure greatly. Loyalty programs and per-customer pricing, such as special discounts, are one set of tools used in the past, and used more. Moreover, there is an increased demand to communicate efficiently with management, employees, customers and other associated with the retail environment. Such concerns also extend to situations and environments besides retail settings. Modern communication devices provide for many communication and business analytics opportunities in retail and other settings.

BRIEF DESCRIPTION OF THE DRAWINGS

FIG. 3 illustrates a flowchart of an example method for structuring communication in an observation platform in accordance with embodiments of the present technology.

FIG. 4 illustrates a flowchart of an example method for disciplining communications in accordance with embodiments of the present technology.

FIG. 5 illustrates a flowchart of an example method for observing and recording users of communication devices in accordance with embodiments of the present technology.

FIG. 6 illustrates a flowchart of an example method for characterizing communications in a group of users in accordance with embodiments of the present technology.

FIG. 7 illustrates a flowchart of an example method for structuring communication in a plurality of observation platforms in accordance with embodiments of the present technology.

FIG. 10 illustrates a flowchart of an example method for performing communications in an of observation platforms in accordance with embodiments of the present technology.

FIG. 11 illustrates a flowchart of an example method for performing communications in an of observation platforms in accordance with embodiments of the present technology.

FIG. 12 illustrates a flowchart of an example method for performing communications in an of observation platforms in accordance with embodiments of the present technology.

FIG. 13 illustrates a flowchart of an example method for structured training in an observation platform in accordance with embodiments of the present technology.

FIG. 14 illustrates a flowchart of an example method for monitoring communications in an observation platform in accordance with embodiments of the present technology.

FIG. 15 illustrates a flowchart of an example method for mining data in an observation platform in accordance with embodiments of the present technology.

FIG. 16 illustrates a flowchart of an example method for mining data in an observation platform in accordance with embodiments of the present technology.

FIG. 17 illustrates a flowchart of an example method for using structured communications in an observation platform with cloud computing in accordance with embodiments of the present technology.

FIG. 18 illustrates a flowchart of an example method for receiving technical support in an observation platform in accordance with embodiments of the present technology.

Figure 1A:
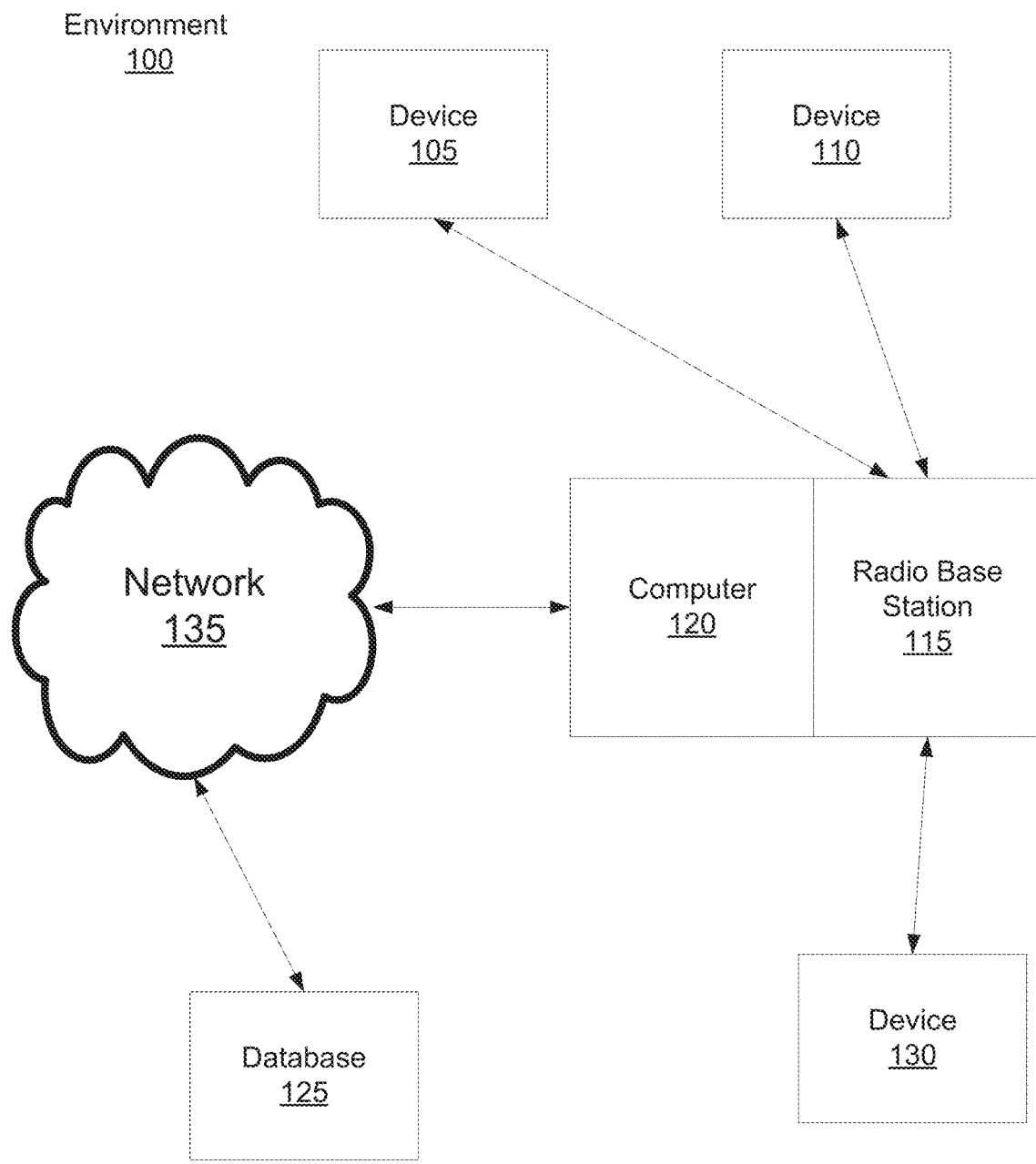
FIG. 1A illustrates a block diagram of an example environment for an observation platform for structuring a communication in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "recognizing," "deriving," "storing," "relaying," "executing," "generating," "determining," "tracking," "recording," "identifying," "making," "sending," "tracking," "monitoring," "mining," or the like, refer to the actions and processes of a computer system, or similar electronic computing device. The computer system or similar electronic computing device, such as a telephone, smartphone, smartphone in conjunction with a Bluetooth peripheral, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Using Structured Communications in an Observation Platform with Cloud Computing Embodiments of the present technology are for mediating a communication in an observation platform. The observation platform may involve a number of users or people and provides structure and discipline communications for the users and captures data regarding the communications such as performance metrics. The present technology may be employed in various environments such as retail settings, public-stage floors, outdoor venues, concerts, police scenarios, disaster areas, schools, sporting events, hospitality operations, security operations, military operations, a prison organization, customer service, manufacturing organization, a factory, and other environments where humans work together and where communications occur between users.

Using structuring communications in an observation platform, as referred to herein, may refer to the following actions regarding communications between two or more users: mediating, disciplining, structuring, controlling, participating, discouraging, encouraging, influencing, nudging, making an example of, permitting, managing, managing to be in compliance with policies, measuring what goes on as a communication occurs, characterizing, enabling, observing, recording, correcting, directing, etc.

The mediating, structuring or disciplining process envisioned herein involves using a communications and computer system as a platform receive communications, to generate or parse metadata related to the communication, and to relay the communication based on the metadata. Communications are enabled by multiple means including: simply speaking names, questions or commands; press-to-talk broadcasting to everyone, groups or locations; listening to pre-established information (e.g., podcasts or info-casts), information from other users on the system, or information from other systems or processes within this system related to actions required or information necessary. The system, including other users, may prompt users for verbal contributions to the data store or seek selected button presses to determine further context or supplemental information and actions of the user. In conjunction with the communications and signaling information being exchanged, the system collects other relevant data which may include signals or sounds useful for location determination, sounds useful for system optimization or user environment detection, or other signal information relevant to operating in the desired coverage space.

One purpose of structuring or disciplining a communication is for associates to become better customer service associates or sales people in a retail setting. The present technology may accomplish this goal by monitoring communications of the users that occur via communication devices. The communications may be monitored to derive context information from the communication such as the name of the user, geographic location of a user, the state or status of the user (e.g., busy, available, engaged, conversing, listening, out-of-range, not logged on, etc.), business metrics regarding the user's interaction with others, and commands from the user. The communications may be monitored by a computer system associated with a radio base station that acts as a central hub for the user communications. The computer system may convert audible, voice or speech communications to a text or machine-compatible format using standard and well-known techniques. The text may be used to derive the context information from the communication. The computer system may also store some or all of the communication including the time and geographic location of the device, the audible portion of the communication and the text format of the communication. The structured communications may extend beyond a single venue to multiple venues or storage locations without regard to geographic location. Customers or users may refer to customers who are purchasing items in an environment, past customers, potential customers, perspective customers, shoppers, browsers, or others who enter the environment and do not represent the environment in an official capacity such as an employee does.

In one embodiment, the computer system generates or parses metadata related to a communication and also knows metadata for each of a plurality of devices in the observation platform. The computer system is then able to match an attribute of the metadata from the communication to an attribute from the metadata of at least one of the plurality of devices in the observation platform. The communication may then be forwarded to the matched device. The metadata may be described as attributes, tags, or characteristics of a communication. The communication may be a signal generated by user device and may comprise speech, text, audio, video, or a combination thereof. The attributes of the metadata may not be associated with the content of the signal and are related to context of the signal such as the time the signal was sent, an identification of the device that sent the signal, a location of the device when the signal sent, a geographic zone the device is located in, history of the device sending communication, etc. In one embodiment, the metadata is associated with the content of the signal, such as text. The generating of metadata and relaying of the communication may occur substantially in real time such that a user of the device does not perceive any delay in communications.

In one embodiment, the computer system uses the derived context information to determine a destination of the communication and forwards or relays the communication to the destination. For example, a first user may attempt to contact a second user via communication devices. The first user sends the communication to the computer system associated with the radio base station. The computer system recognizes the first user and is able to derive context information regarding the communication and determine that the communication's destination is a third user. The computer system then relays the communication, via the radio base station, to a communication device associated with the third user. The computer system may also convert the communication to text and derive contextual or performance metrics regarding the first or third user. For example, the first user may be an associate in a retail setting and the third user is a customer. The first user may be responding to a query made by the third user. The performance metric may be the length of time it took for the first user to respond to the query or may be whether or not the query was satisfied or may be a different metric entirely. The computer system may derive and store more than one performance metric. The computer system may also access more than one communication regarding a user to determine some metrics.

In one embodiment, the computer system uses the derived context information to determine a destination of the communication and forwards or relays the initial communication to the destination. For example, a first user may attempt to contact a second user via communication devices. The first user sends the communication to the computer system associated with the radio base station. The computer system recognizes the first user and is able to derive context information regarding the communication and determine that the communication's destination is a third user or plurality of users. The computer system then relays the communication, via the radio base station, to a communication device associated with the third user or said plurality of users. The computer system may then instruct the device of the first user to communicate directly with the device(s) of the third or plurality of users for the duration of the conversation. The computer system will continue to observe the communications and will continue to derive contextual and performance information from all connected devices. Additionally, the computer may instruct direct communications between a plurality of devices depending on context and other meta-information, In one embodiment, the computer system is able to determine the state of the user based on either direct user action such as a button press or voice command; or based on inference from words being spoken, motions, locations or other contextual information. In one embodiment, the third user may be out of range of the radio base station and sends communications via a network associated with the computer system. In one embodiment, the third user may be part of a similar operation to that in FIG. 1A, i.e., another retail outlet or corporate headquarters for the same company in a different location as shown in FIG. 1C.

In one embodiment, the first computer system that receives the signal does not perform all of the functions of the present technology, but instead relies on cloud computing to perform some of the functions. For example, the first computer system may receive the signal and then forward it to a second computer system. The second computer system may then derive context information from the signal and determine a destination for the signal. The destination may be one or more communication devices that may or may not be within radio range of the radio base station associated with the computer system. The context information and destination may then be sent to the first computer system. The second computer system may also store data associated with the observation platform such as signal logs, the signals themselves, or speech-to-text conversions of the signals. In one embodiment, the second computer system is not physically proximate to the first computer system but is connected via a network. In one embodiment, the second computer system is a plurality of computer systems that may be a peer-to-peer network, a server farm, computers used for cloud computing, or a combination thereof.

In one embodiment, the computer system is able to determine geographic locations of users based on information received from devices associated with the users. The geographic location data may be stored as data associated with a user's communications device at a particular time, or as a performance metric, or may be combined with other information to generate a performance metric. The geographic information may also be used by managers to manage or train associates or to optimize customer service.

A user, as referred to herein, may be a person or people such as, associates, employees, managers, trainees, trainers, customers, emergency responders, personnel, etc. In one embodiment, the user interfaces with a device for communications with other users. Such a device may be a handheld device, a headset, a smartphone, an earpiece, a radio, a computer system, or other device capable of providing communications between users. Such users may be external to the operating entity and desire access via smart devices or applications.

A performance metric may also be a metric, a key performance indicator (KPI) or a business metric. A metric or performance metric as referred to herein may be any type of data associated with or derived from a communication between users, including the location of the communications device, buttons pressed, or the words spoken and the contextual state at the time of a particular communication event. In one embodiment, the computer system is able to generate a visual representation of metrics. For example, the visual representation may be a map of the geographic location of the users in an environment or may visually demonstrate the status or activities of a user. In another example, the visual representation may be textual information such as the number of communications sent by a user or the length of time it took for a user to respond to a communication or move to a specific location. The performance metrics may be sent or displayed to a manager or other user for use in making decisions. The performance metrics may be used by the manager to optimize customer service in a retail setting by taking actions such as reprimanding or rewarding an associate or measuring who responds and the time it takes to open a new register based on a request from a person or other input signal to the system. Performance metrics may also generate real-time alarms or notifications that action or coordination is needed.

The present technology provides for many examples of how structuring communications may be used in various environments for a variety of purposes. The following discussion will demonstrate various hardware, software, and firmware components that are used with and in computer systems and other user devices for structuring communications using various embodiments of the present technology. Furthermore, the systems, platforms, and methods may include some, all, or none of the hardware, software, and firmware components discussed below.

Using Structured Communications in an
Observation Platform with Cloud Computing

With reference now to FIG. 1A, a block diagram of an environment 100 for training, monitoring, and mining communications in an observation platform. Environment 100 includes devices 105, 110 and 130, radio base station 115, computer 120, database 125 and network 135. Environment 100 comprises components that may or may not be used with different embodiments of the present technology and should not be construed to limit the present technology. Some or all of the components of environment 100 may be described as an observation platform for structuring a communication.

The present technology makes use of communication devices. Radio base station 115 and devices 105, 110 and 130 may also be described as communication devices. Devices 105, 110 and 130 may be user devices that are mobile and employed by a user to communicate with other users via other devices. Communications between the devices may be described as signals. The devices 105, 110 and 130 may be a smartphone, a personal digital assistant, a fob, a handheld device, a headset device or other small electronic device. In one embodiment, devices 105, 110 and 130 employ speakers and microphones with control buttons for audible communications. The control buttons may be press to signal buttons, push to talk buttons, volume control buttons, and power on/off buttons or other standard buttons and may be options on a touchscreen. Devices 105, 110 and 130 may be handheld, may be worn around the neck, and may be a headset worn on the head or behind the ear or otherwise interface with the human body. Devices 105, 110 and 130 may or may not comprise a screen or display such as a liquid crystal display (LCD). In one embodiment, devices 105, 110 and 130 do not comprise a display such that a user is not inundated with too many options or too much information from the device. A user device without a display may simplify communications and thus allow heads-up awareness and presence in the environment. Another user, such as a customer, may be more likely to employ the device for its intended purpose if the human interface is simplified.

Devices 105, 110 and 130 and other devices in environment 100 may be dispensed to a user upon entering environment 100 or may be brought by the user into environment 100. For example, in a retail setting, associates may be issued devices by the employer or owner of the retailer setting. Customers in the retail setting may also be offered or issued devices as they enter the retail setting. Customers may choose whether or not to accept the device or whether or not to use the device after accepting it. The associate devices and the customer devices may or may not be the same type or model of devices. Alternatively, the customer may bring a device into the retail setting such as a smartphone. An application on the customer's smartphone will allow the customer to use the device for communications in the store with associates or others in accordance with present technology. The customer may remain anonymous or may elect to identify themselves. In one embodiment, recognition of the customer's identity is not required for additional services or offers.

Devices 105, 110 and 130 may be low power devices. The devices may use batteries or solar power including either ambient or battery solar power in a low duty-cycle manner to save power. In one embodiment, the devices have an automatic sleep function when location of the device does not change and no communications are sent or received after a period of time.

Radio base station 115 may be a communication device that is capable of communicating with devices 105, 110 and 130. Radio base station may simply be a component of computer 120 or may be a standalone device that is coupled with, connect to, or otherwise associated with computer 120. Radio base station 115 and computer 120 may be physically adjacent to one another or may be separated by a distance (e.g., cloud services). Computer 120 is able to receive communications from radio base station 115 and to send communications to radio base station 115 for radio base station 115 to transmit the communication to its destination. Computer 120 is a computer system with a process and memory and is capable of executing commands, software and firmware. Computer 120 may be a desktop computer, a server computer, a cloud-based computer or other standard computing system or may be custom built for the present technology.

Radio base station 115 and devices 105, 110 and 130 employ standard techniques for communicating wirelessly. The communications may be performed using radio techniques such as near field communications, short wave radio, infrared, Bluetooth, Wi-Fi, standard wireless computer network protocols, etc. Devices 105, 110 and 130 may be able to communicate with each other directly or through radio base station 115. Devices 105, 110 and 130 communicate with each other under the control of the computer system 120. In one embodiment, all communications in environment 100 are relayed through radio base station 115 which acts as a central hub. For example, device 105 may communicate with device 110 by device 105 sending a communication to radio base station 115, computer 120 derives that device 110 is the destination for the communication and relays the communication to device 110. This may occur automatically and quickly enough such that the users will not experience any undue lag in communications. In one embodiment, devices 105, 110 and 130 may communicate directly with computer 120. For example, a user may issue a command to computer 120 via device 105 or computer 120 may send information to device 105. Information sent from computer 120 to device 105 may be an audible voice signal or may be textual, contextual, geographical or graphical data to be displayed at device 105, if it is properly equipped to do so.

In one embodiment, devices 105, 110 and 130 may communicate with one another directly, and their signals may be monitored and processed by computer system 120 via a monitoring system associated with the radio base station 115. Instructions or commands may still be directed towards the computer system 120.

In one embodiment, computer 120 is able to recognize a user sending a communication. The user may be recognized based on the device used to send the communication to computer 120 and radio base station 115. For example, device 105 may have a unique signature associated with its transmissions such that computer 120 can identify differentiate the device from another user. Such recognition of a user may then be employed by computer 120 for future communications with other devices. In one embodiment, the signal or communications between devices are encrypted. The signal may be encoded such that it is unique to a specific device. The encryption or encoding may be employed by computer 120 to recognize the user of the device. In one embodiment, the user may identify himself to the computer system 120 and the computer system 120 makes the association between user identification and device 105's internal electronic identification.

Computer 120 may determine that the destination of a communication is a single device or a plurality of devices. Thus computer 120 may relay a communication from device 105 only to device 110 or may relay it to both device 110 and device 130. Computer 120 may determine that another user device is the destination of a communication originated by device 105 but may also directly respond to the communication by executing a command or sending a communication back to device 105. In one embodiment, a communication from device 105 has more than one characteristic or aspect. For example, the communication may have a first characteristic that corresponds to an audible source such the words spoken by a user employing device 105. The communication may also contain contextual information such as engaged, available, listening to information, communicating in a conversation, out-of-range, returning to coverage zones, or other behavioral/contextual information. The communication may also have a third characteristic that comprises geographical position information of device 105 or may have information indicative of a geographic position of device 105. Computer 120 is able to determine a geographic position and direction of motion of a device from the information indicative of a geographic position of device. The motion may also be described as path of travel. A characteristic of the communication may be a portion of the communication, data associated with the communication, attributes of the communication, or metadata regarding the communication.

In one embodiment, computer 120 comprises a storage medium for storing some or all of a communication. Computer 120 may store all communications between devices in environment 100. Computer 120 may store communications for a pre-determined amount of time or based on other characteristics such as user, location or types of communications. Different characteristics of the communication may be stored including portions of the communication itself. Additionally, the computer may request and store all audible information regardless if the user presses a push to talk button or otherwise signals the need to begin a communication. For example, the communication may comprise an audible portion, a text portion, information indicative of a geographical position, and a geographical data portion. The audible portion may also be converted to text. Computer 120 may store all or some of the different portions including the portion converted to text. Computer 120 may store geographic position information regarding a device over a period of time such that a path of travel or speed/direction of the user may be inferred. Thus the position and context of a user may be mapped, tracked or predicted through a physical environment or area.

In one embodiment, computer 120 receives a communication from a device with a portion of the communication that corresponds to spoken words of the user of the device. Computer 120 is able to convert the spoken words portion to information used by computer 120 to derive context information from the communication to determine performance metrics regarding the communication or the user of the device. The resulting information may also be interpreted as a command for computer 120 to execute. The resulting information may also be employed to determine a destination for the communication or to trigger an automated response from the system using stored or external information.

In one embodiment, each speaker is identified with a unique identifier with each voice file so that a speech-to-text engine can train on the speaker's voice and more accurately choose words from the dictionaries and individual user grammars. Individually customized dictionaries and grammars may be used for the sequential context of the spoken words. For example, saying, "urgent Bob" is interpreted by looking up the first word in a command dictionary and the second word in a names or places dictionary. In one embodiment, a frequency table is built for each user defining how frequently they call a name or place to improve the probability of selecting the correct word. In one embodiment, if a command, name, or place is not understood, the system may default to the most likely destination group. The user can easily opt out of the default destination and start again. Alternatively, if the command, name or place is not recognized, the computer system 120 may be programmed to default to a simple reply such as "please say again" or "person not found."

In one embodiment, computer 120 executes a command received from device 105. The command may be directly received from device 105 or may be received in an audible voice signal which is converted to text and then interpreted to be a command for computer 120. The command may be to initiate a virtual voice connection between device 105 and device 110. The command may be to initiate a connection to a telephony system such that a user of device 105 may communicate with another user who is employing a telephone for communication. The command may be for computer 120 to store information into or extract information out of database 125.

In one embodiment, computer 120 is able to access database 125 over network 135. Network 135 may be a local area network, a wireless network, the Internet or another computer network. In one embodiment, database 125 is a component part of computer 120 and network 135 is not required for computer 120 to access database 125. Database 125 may comprise an inventory of product or any other type of information. For example, in a retail setting a customer may use a device to communicate with an associate regarding whether the retail setting has a particular product in stock or where the product is located. The associate may use key terms to query computer 120 regarding whether the product is in stock. Computer 120 may convert the associate's voice to text and recognize the command regarding whether the product is in stock. Computer 120 then queries database 125 and sends a response back to the associate and/or customer. The response may be sent back using an audible signal or a signal to be displayed on a screen at the user device. Similar examples may be constructed around product location databases, workforce scheduling systems, on-floor zone assignments, time clock systems, door counter systems, video surveillance systems, data aggregation systems or other information systems used for operations and reporting. Alternatively, computer 120 may recognize a command based on the converted text without a user saying key terms.

Computer 120 and any ancillary programs may detect audio characteristics such as "too much background noise", "speaking too loudly" (over-modulation), "speaking too softly" (under-modulation), "speaking to quickly" or "excessive pausing." The computer may then issue an audible prompt to the user to correct the situation for improved recognition of spoken words. Systematically monitoring the each individual user (not device) and scripted prompts allows the computer to better learn the user characteristics while at the same time allows the user to modify behavior and speech to better communicate with the system.

Database 125 may be a local inventory or a larger inventory. In one embodiment, database 125 is not an inventory but comprises different data. For example, a user may employ the device to communicate with and command computer 120 to perform a key word search of the Internet using a search engine such as a website search engine.

Figure 1B:
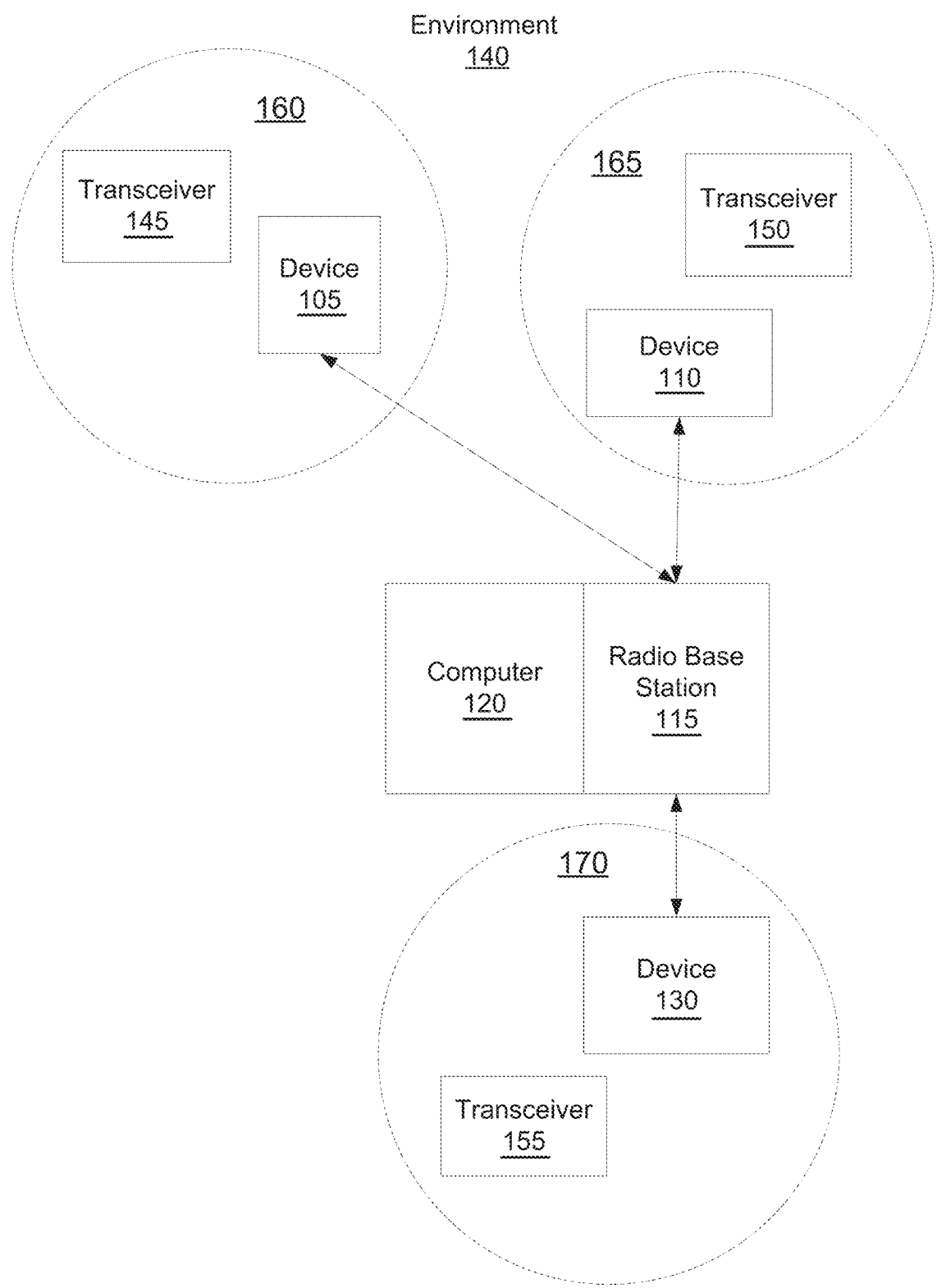
FIG. 1B illustrates a block diagram of an example environment for an observation platform for structuring a communication in accordance with other embodiments of the present technology.
Figure 1C:
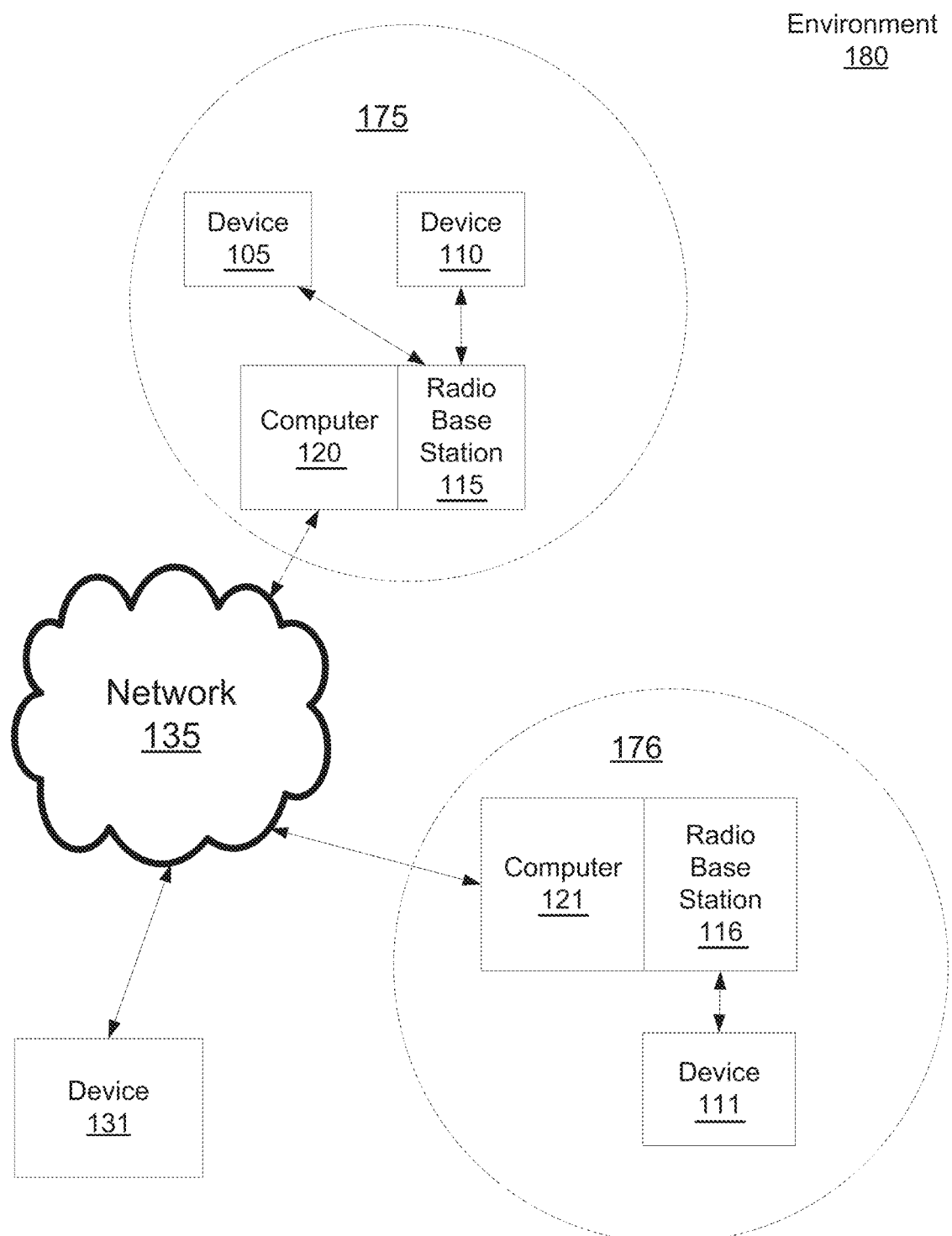
FIG. 1C illustrates a block diagram of an example environment for an observation platform for structuring a communication in accordance with other embodiments of the present technology.

With reference now to FIG. 1B, a block diagram of an environment 140 for training, monitoring, and mining communications in an observation platform. Environment 140 includes devices 105, 110 and 130, radio base station 115, computer 120, transceivers 145, 150, and 155, and regions 160, 165, and 170. Environment 140 comprises components that may or may not be used with different embodiments of the present technology and should not be construed to limit the present technology. Some or all of the components of environment 140 may be described as an observation platform for structuring a communication.

Transceivers 145, 150, and 155 are capable of sending and receiving signals to and from radio base station 115 and devices 105, 110 and 130. Transceivers 145, 150, and 155 may or may not be networked to one another and to either radio base station 115, computer 120 or both. Transceivers 145, 150, and 155 may be transceivers such as wireless routers in a computing network. The transceivers may relay a communication from a user device to computer 120. A communication or signal may be routed through a plurality of transceivers before reaching computer 120. Transceivers need not connect to any network or computer and may be located throughout the environment as needed for the location accuracy desired. Additionally, the transceivers may use a low duty cycle beacon that may be time synchronized with devices in under the control of computer 120.

In one embodiment, the transceivers may be uniquely identifiable such that a communication may comprise a characteristic that identifies the communication as being routed through a given transceiver. This identification of the transceiver may be employed by computer 120 to determine a geographic location of a device or user. Thus, a characteristic of the communication may be an identity of a transceiver and comprises information that is indicative of a geographic position. Computer 120 may determine that a device is in a geographic region that is associated with a transceiver such as region 160 associated with transceiver 145. Computer 120 may also use geographic information and user motion characteristics to predict and pre-set association to the next likely transceiver.

In one embodiment, computer 120 determines the geographic location of a device based on a transceiver signal strength received at the device from one or more transceivers. For example, device 130 may receive signals from both transceivers 150 and 155 each with a corresponding signal strength. The signal strength data is sent from device 130 to computer 120 as a characteristic of a signal or communication sent to computer 120. The signal strength data is then used by computer 120 to determine the geographic position of device 130.

Transceivers 145, 150, and 155 each have an associated region such as regions 160, 165, and 170. The regions may define the transmission range of the transceiver or may be defined based on some other criteria. In one embodiment, the regions may be described as wireless hotspots or 802.11 access points (APs). Regions 160, 165 and 170 may be well defined geographical regions either indoors or outdoors and may be known to computer 120. Regions 160, 165 and 170 are depicted as not overlapping one another. However, the regions may or may not overlap one another. In one embodiment, computer 120 may determine the geographic location of a device based on its location in one or more regions. For example, device 105 may be located in region 160 for its primary communications, yet is capable of receiving signals strength measurements from regions 165 and 170. In another example, regions 160 and 165 may be overlapping and computer 120 determines that device 110 is in the overlapping portions of region 160 and 165 because a characteristic of a communication from device 110 indicates that device 110 is capable of transmitting to and receiving signals from both transceiver 145 and 150. Thus a characteristic of signal sent from a user device to computer 120 may be contents of a communication, a portion of a communication corresponding to an audible source, signal strength data of a transceiver, an identity of a transceiver, geographic position data, or other information.

In one embodiment, computer 120 determines the geographic motion, movement, or path of travel of a user based on transceiver signal strengths received at the device from one or more transceivers. Movement of the communications device 130 may be derived from data regarding signal strength measurements made at one or more of the transceivers, where the signal strength is measured and sampled at successive time intervals, via well-known methods. For example, as a user moves about the region in environment 140, the signal strength will increase at one transceiver device and decrease at another. Movement of the communications device 130 may also be derived from internal components in the device such as accelerometers, barometers, or magnetic compasses, again via successive time samples of data. This data may be used to detect a more accurate range of movement.

With reference now to FIG. 1C, a block diagram of an environment 180 for training, monitoring, and mining communications in an observation platform. Environment 180 includes devices 105, 110, 111 and 131, radio base stations 115 and 116, computers 120 and 121, network 135 and regions 175 and 176. Environment 180 comprises components that may or may not be used with different embodiments of the present technology and should not be construed to limit the present technology. Some or all of the components of environment 180 may be described as an observation platform for structuring a communication.

In one embodiment, device 105 and 110 are located within region 175. The components depicted within region 175 may be described as an observation platform. Region 175 may be described as having a radio range, or span of operating distance. For example, radio base station 115 may have a physical limit regarding the distance which it may transmit radio signals. Therefore, a device outside of the radio range, such as devices 131 or 111 will not be able to communicate with computer 120 via a radio signal transmitted from radio base station 115. Additionally, devices 105, 110, 111 and 131 may also have a limited radio range.

These limitations may be overcome by computer 120 relaying the communication to either device 131 or a second observation platform within region 176 via network 135. Therefore, devices 105 and 110 may communicate with either device 111 or 131 where the communications are relayed by computer 120 and network 135. Region 176 may be described as a second observation platform with components that are duplicates of or similar to components of region 175. The regions 175 and 176 may comprises any number of communication devices or other components such computers, routers, and transceivers. Thus, the present technology provides for structured or disciplined communications between at least two user devices, or a plurality of devices, that may or may not be within radio range of one another.

In one embodiment, the communications between computer 120 and devices 105 and 110 are accomplished via radio signals and the communications between device 131 and computer 120 are accomplished via network 135. In one embodiment, the connected between network 135 and device 131 is telephony call such that device 105, which may not be a telephone, places a phone call to device 131, which is a telephone, via the observation platform. In such an embodiment, network 135 may comprise both a computer network and a phone network or cloud.

In one embodiment, device 131 and/or region 176 may be physically remote relative to radio base station 115. For example, all the components shown within region 175 may be located within radio range of one another at a first location, but device 131 and region 176 are located at a second and third location outside of region 175. These first, second and third locations may be separated by any length of distance. The second or third location may be hundreds or even thousands of miles away from the first location or may be less than a mile away but still outside of region 175. In one embodiment, computer 120 and radio base station 115 are located at a first physical address such as a street address for a building or other physical location, device 131 is located at a second physical address, and computer 121 and radio base station 116 are located at a third physical address.

In one embodiment, computer 120 and radio base station 115 are associated with a retail environment and region 175 includes the retail floor as well as an office or other area designated for associates, managers, or employees of the retail environment. However, computer 121 and radio base station 116 are located in region 176 are located at a second retail environment. The first and second retail environments may be related to one another such as both being a franchise of the same business or enterprise. Thus, a customer or associate may be located in region 175 associated with a first franchise, e.g. a first observation platform, and speak with an associate using device 111 in a second franchise, e.g., a second observation platform. The customer or associate may ask questions regarding the inventory of an item at the second franchise or speak with an associate at the second franchise that has knowledge not known by associates at the first franchise.

Figure 1D:
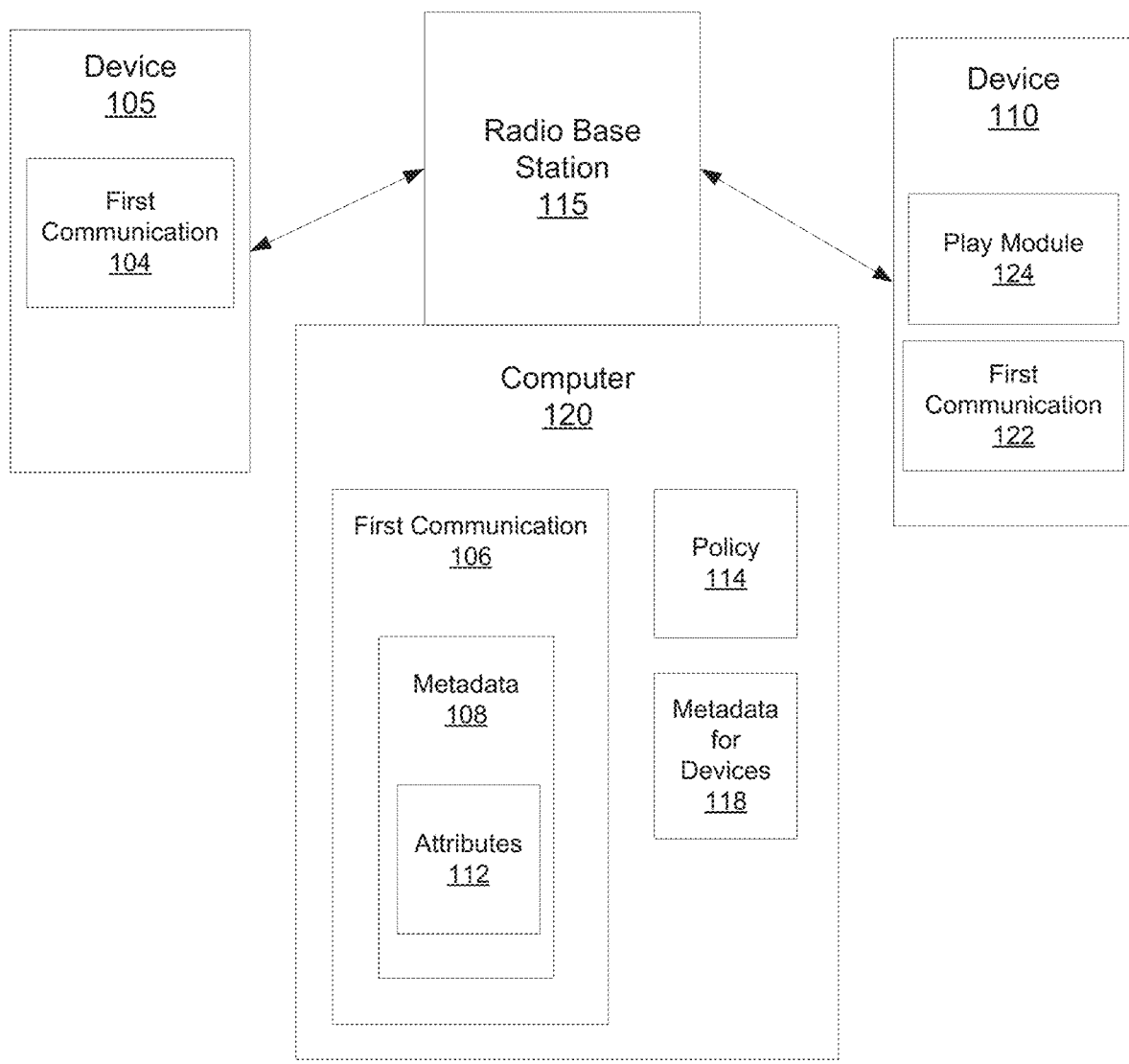
FIG. 1D illustrates a block diagram of an example environment for an observation platform for mediating a communication in accordance with other embodiments of the present technology.

With reference now to FIG. 1D, a block diagram of an environment 190 for mediating a communication in an observation platform. Environment 190 includes devices 105 and 110, radio base station 115, computer 120, first communication 104, 106 and 122, metadata 108, attribute 112, policy 114, metadata for devices 118 and play module 124. Environment 190 comprises components that may or may not be used with different embodiments of the present technology and should not be construed to limit the present technology. Some or all of the components of environment 190 may be described as an observation platform.

In one embodiment, devices 105 and 110, radio base station 115, and computer 120 have the same capabilities of their counterparts in FIG. 1A. Device 105 is able to send first communication 104 to computer system 120 via radio base station 115. Computer system 120 may be located physically proximate to the devices or it may be remote and connected via a network. Computer 120 may also be a plurality of computers connected using cloud computing techniques. It should be appreciated that first communication 104 may be generated by a user employing device 105 and the content may include audio, speech, text, images, video, or any combination thereof. First communication 104 may also be described as speech, oration, or play. First communication 104 may also include additional characteristics such as data indicative of a geographic location of device 105, a timestamp of when first communication 104 was generated and sent, the identity of a user associated with device 105, etc. In one embodiment, computer 120 stores first communication 104 as first communication 106 and parses or generates metadata 108 associated with first communication 106 according to policy 105. It should be appreciated that metadata 108 may be related to the actual content of first communication 104, may be related to the additional characteristics of first communication 104, or may be a combination. Additionally, metadata 108 may comprise data related to a history of the use of device 105 such as statistical data of how many communications are sent and received by device 105. Such data may not be part of first communication 104, but may be stored and accessed in metadata for devices 118.

In one embodiment, metadata 108 includes content from first communication 104 that directs the destination of the communication. For example, first communication 104 may comprise an audible portion with the words "Bob are you there?" Computer system 120 may convert the audible portion of first communication 104 to text and parse the phrase "are you there" as a command to relay the communication to "Bob." Additionally, metadata for device 118 may know that the name "Bob" is associated with a given device, first communication 104 is then relayed to the given device. Alternatively, computer system 120, may parse the phrase and respond with the known state and location of "Bob," e.g., "Bob is available in aisle seven."

Metadata 108 may also be a unique message identification number generated by computer 120 for first communication 104, a group identification number that associates first communication 104 with a series of related communications, and/or a geographic zone in which device 105 is located in. Metadata 108 may also comprise data associated with the status of device 105 and/or the status of the user associated with device 105. Such status data may indicate whether the user of device 105 is busy, engaged, available, not on the system, not in rage, in a conversation, in training, etc. The status data may be generated by computer 120 and may be based on data from the history of device 105 or from first communication 104. Metadata 108 may also be a classification of a user associated with the device. Such classification may be an expertise such as a "paint expert" or "cashier" or may be more generic such as customer, manager, employee, associate, vendor, etc. Metadata 108 may also be a start and stop time of the communication.

In one embodiment, metadata 108 is parsed into individual attributes 112 and stored as a set of attributes. Portions or all of metadata 108 may also be copied and stored by computer 120 as metadata for devices 118. In one embodiment, metadata for devices 118 stores metadata for a plurality of devices associated with the observation platform such as device 110. It should be appreciated that metadata 108, attributes 112 and metadata for devices 118 are each controlled by policy 114. Policy 114 comprises policies, instructions, and/or rules for the generation, usage and storage of metadata. For example, policy 114 may dictate that every communication, such as first communication 104, should have an attribute stored indicating the geographic location of the device when it sent the communication. In one embodiment, policy 114 determines the length of time an attribute is stored for. In one embodiment, policy 114 is programmable or customized. In other words, policies may be changed during the operation of the observation platform and may be assigned to devices, groups of devices or individual users, if known. The devices may store a portion of the policy to control what data is sent with a communication to computer system 120. Changes in the policy may be sent to the devices. However, policy 114 may simply be a default policy. One example of a set of policies is a walkie-talkie emulator policy where the policies allow the devices in the observation platform to emulate walkie-talkies.

Metadata for devices 118 may include metadata and/or attributes similar to those described for metadata 108 only in relation to a plurality of devices rather than just one device. In one embodiment, computer system 120 compares attributes 112 to the attributes for other devices stored in metadata for devices 118 to identify a recipient device for first communication 104. In one embodiment, the identification is accomplished by matching one attribute. For example, first communication 106 may comprise an attribute that matches an attribute stored in metadata for devices 118 that is associated with device 110. Thus the matching attribute identifies device 110 as a recipient device for first communication 104. Once such an identification is made, first communication 104 may be relayed to device 110 as first communication 122 via computer system 120 and radio base station 115. First communication 122 may be identical to first communication 104 or may similar to first communication 106 and comprise metadata 108.

In one embodiment, computer system 120 identifies a recipient device by matching a single attribute. In one embodiment, computer system 120 will relay first communication 104 to every device that has a matching attribute with any one of the attributes from attributes 112. For example, device 110 may have a geographic position attribute that matches a first attribute from attributes 112 while a third device has a timestamp attribute related to a second attribute of attributes 112. In this example, both device 110 and the third device will be relayed the communication as recipient devices. It should also be appreciated that a plurality of devices may all have the same attribute matching a first attribute from attributes 112 and each of the plurality of the devices are then relayed the communication.

In one embodiment, computer system 120 will not relay first communication 104 to a device that has a matching attribute if the attribute is blocked by an inhibitor for the given device. Such an inhibitor may be received at computer system 120 from a device or may be generated and stored by computer system 120. In one embodiment, the generation of inhibitors is controlled by policy 114. For example, an inhibitor may be associated with device 105 in relation to first communication 104 such that computer system 120 does not relay first communication 104 back to device 105 even if a matching attribute is found. Other inhibitors may be related to the status of a device. For example, if a device status is "busy" or "engaged with customer" than computer system 120 may be inhibited from identifying such a matching device as a recipient device.

In one embodiment, an inhibitor may be overridden by an attribute. For example, a communication that is marked "urgent" or "interrupt" may override certain inhibitors or any inhibitor associated with the status of a device.

In one embodiment, computer system 120 identifies a recipient device based on a voting system involving a plurality of matches of attributes and/or inhibitors. For example, in the voting system, an attribute may be assigned a numerical value such as +1 and an inhibitor a value of −1. The voting system will then tally all of the numerical values and if the tally for a given device is positive, or above a predetermined threshold, then the given device will be identified as a recipient device and relayed the communication. It should be appreciated that some attributes may also be given a negative value such as status or available of a device or the location of a device in a predetermined zone.

In one embodiment, device 110 receives the relayed first communication at play module 124. Play module 124 may operate to automatically play a relayed communication once it is received. Play module 124 may also trigger a notification to a user of device 110 that a relayed communication has been received. In one embodiment, the playback of the relayed communication is governed by a policy on play module 124 that is associated with policy 114.

In one embodiment, device 110 is utilized to generated and send a second communication from device 110 back to computer system 120. Computer system 120 may then similarly parse metadata for the second communication and determine that it is responsive to first communication 104 and relay the second communication to device 105. This determination may be made by matching attributes of metadata and may also be based on timestamps of the communications in conjunction with policy. In one embodiment, the second communication is relayed to all of the device that the first communication was relayed to.

In one embodiment, the first communication is relayed to a plurality of recipient devices which is described as a one-to-many communication. Once a second communication, or responsive communication, is received then subsequent communications may only be sent to and from the first device and the responsive device. Thus a one-to-many communication stream may be narrowed to a one-to-one communication stream where a communication stream is defined as a series of communications. By responding to a first communication, the user of the responding device self-selects herself to be included in the future communication stream.

In one embodiment, the first and second communication are sent and received by the devices in substantially real time. For example, computer system 120 may be parsing and matching metadata and relaying the communications, but computer system 120 may operate on the scale of microseconds such that the users of the devices will not perceive any lag and the series of communications will be perceived to occur in real time. Thus the present technology may be described as operating an observation platform whose point is satisfying unique requirements of an environment such as a retail environment. The present technology is built around forwarding voice messages fast by selecting what messages to play on what devices. The selection is made employing by comparing metadata or message tags to tags on objects associated with each device or communicator.

In one embodiment, first communication 104 may be generated automatically by device 105 in response to a predetermined event, action or series thereof. For example, an employee's time may be tracked for time card purposes using communications from the device. Communications may be sent to that log when and where an employee is located and the communications may be sent automatically upon the device entering or exiting geographic zones.

Figure 1E:
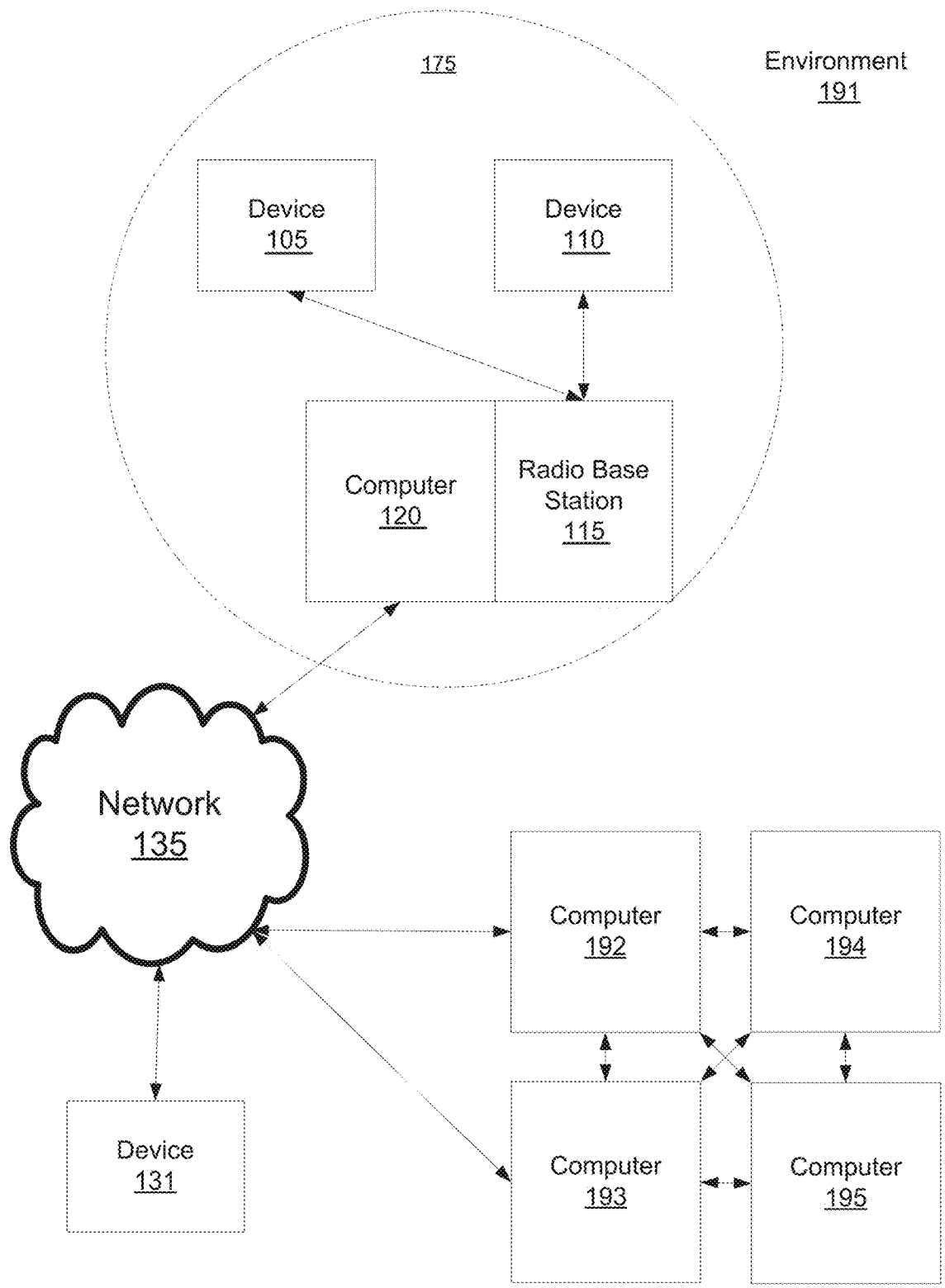
FIG. 1E illustrates a block diagram of an example environment for an observation platform for structuring a communication with cloud computing in accordance with other embodiments of the present technology.

With reference now to FIG. 1E, a block diagram of an environment 191 for using structured communications in an observation platform with cloud computing. Environment 191 includes devices 105 and 110, radio base station 115, computer 120, network 135, device 131, region 175, computers 192, 193, 194, and 195. Environment 191 comprises components that may or may not be used with different embodiments of the present technology and should not be construed to limit the present technology.

In one embodiment, devices 105 and 110, radio base station 115, computer 120, network 135, device 131, region 175, have the same capabilities of their counterparts in FIG. 1C. Device 105 is able to send first communication 104 to computer system 120 via radio base station 115. Region 175 may depict a radio range of device 105, device 110 and radio base station 115. Region 175 may also describe a first observation platform. Computer system 120 is depicted as being connected to computers 192, 193, 194, and 195 via network 135. In one embodiment, region 175 is physically remote or not proximate to computers 192, 193, 194, and 195 and device 131. For example, region 175 may be a in a retail setting and computers 192, 193, 194, and 195 are located anywhere else in the world and may be separated by hundreds or thousands of miles or may be located just outside of radio range of radio base station 115. It should be appreciated that computers 192, 193, 194, and 195 may or may not be located physically proximate to one another.

In one embodiment, computers 192, 193, 194, and 195 may be used for cloud computing techniques. Computer 120 may be in contact with one or more of the computer such as computer 192 and computer 193 as depicted by the arrows connecting computer 192 and computer 193 to network 135. In one embodiment, computer 120 forwards data and commands to a single computer such as computer 192, computer 192 then forwards data and commands to other computers. In one embodiment, computers 192, 193, 194, and 195 perform functions for the present technology and then send results back to computer 120. For example, cloud computing may be used to perform steps such as deriving context information from a signal and determining a destination based on the context information. One or more of computers 192, 193, 194, and 195 may send results back to computer 120. Thus a portion of the computational burden and storage requirements are taken from computer 120 and the hardware requirements for an individual observation platform are reduced.

Computers 192, 193, 194, and 195 may be networked to one another using a variety of techniques and may be connected as nodes in a peer-to-peer network. Computers 192, 193, 194, and 195 may be personal computers, server computers, virtual computers, or any number of other computers. It should be appreciated that all of the processes of the present technology may employ cloud computing for some or all of the steps associated with the process. Specifically, processes 300, 400, 500, 600, 700, 800, 900, 1000, 1100, 1200, 1300, 1400, 1500, 1600, 1700, and 1800 may all employ cloud computing techniques. Through the use of cloud computing, portions of the present technology may be virtualized.

Figure 2:
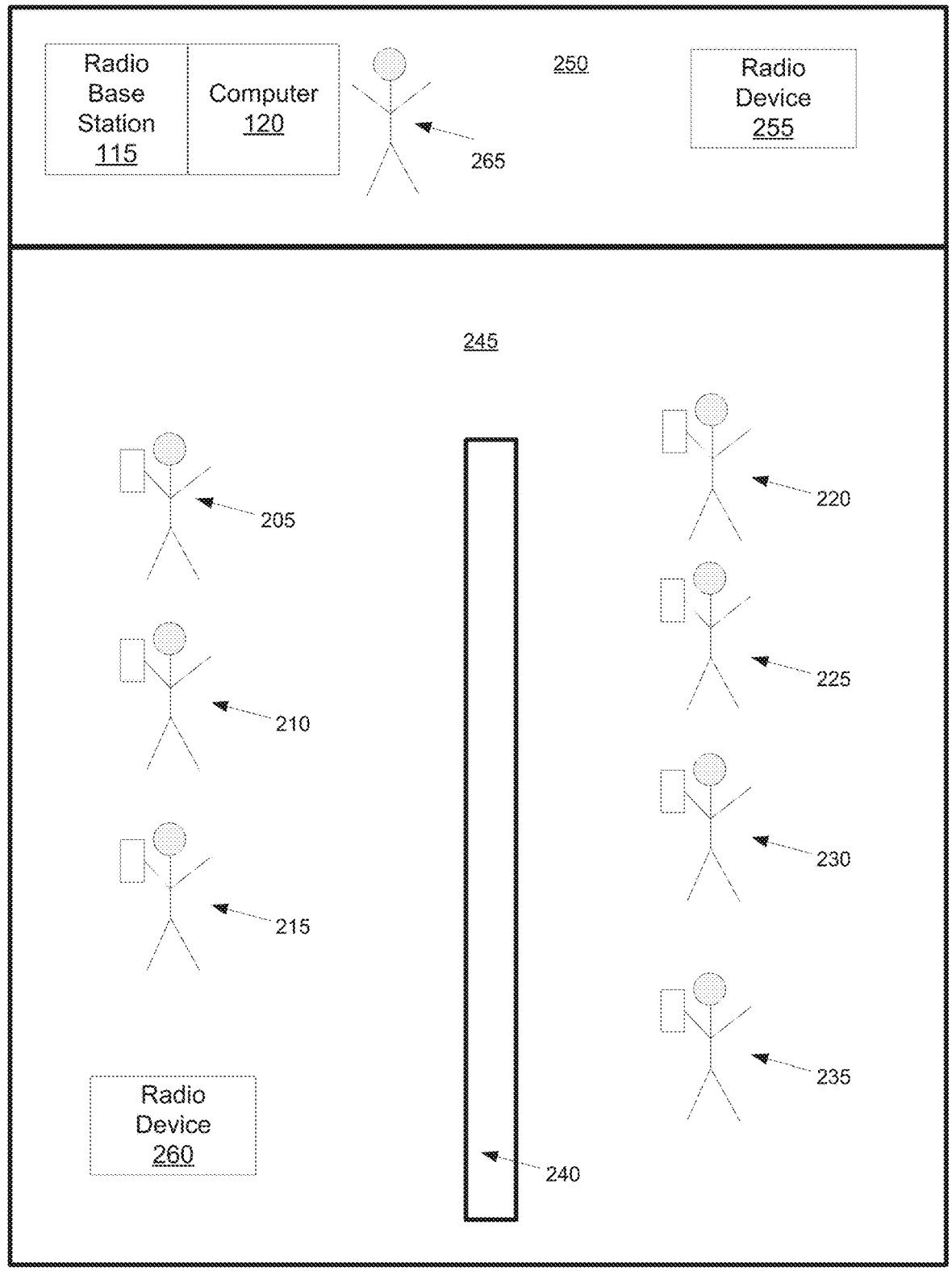
FIG. 2 illustrates a block diagram of an example environment for structuring communication in an observation platform in accordance with embodiments of the present technology.

With reference now to FIG. 2, a block diagram of an environment 200 for training, monitoring, and mining communications in an environment. Environment 200 includes radio base station 115, computer 120, users 205, 210, 215, 220, 225, 230, and 235, structure 240, area 245, area 250, radio devices 255 and 260 and user 265. Environment 200 comprises components that may or may not be used with different embodiments of the present technology and should not be construed to limit the present technology.

Environment 200 depicts a setting in which the present technology may be employed. Environment 200 may be, but is not limited to, retail settings, public-stage floors, outdoor venues, concerts, police scenarios, disaster areas, and other environments where communications occur between users. Areas 245 and 250 are depicted as being enclosed. However, the present technology may be implemented in an outdoor or indoor environment or a combination of the two. Users 205, 210, 215, 220, 225, 230, and 235 are depicted as each holding a device such as device 105 of FIG. 1. The devices do not necessarily need to be handheld. Users 205, 210, 215, 220, 225, 230, and 235 may be a variety of different types of users. For example, the users may be associates and customers intermingled in a retail setting. Area 245 may be the retail floor while area 250 is a back office or other area designated for associates, managers, or employees of the retail environment.

Structure 240 may be a display, shelves, aisle divider, or other structure that physically separates spaces in area 245. For example, users 205, 210, and 215 are depicted as being in separate space of area 245 than users 220, 225, 230, and 235. Computer 120 may be able to interact with users 205, 210, 215, 220, 225, 230, and 235 and determine the user's geographic locations as well as act as a central hub for all communications between the users. In one embodiment, computer 120 recognizes a group of users associated with communication devices. The group may be based on a classification or type of user or may be based on a location of said users. In one example, computer 120 recognizes that users 205, 215, 230, and 235 are associates and users 210, 220, and 225 are customers in a retail setting. The associates may be considered a first group and the customers a second group. In a second example, computer 120 recognizes that users 205, 210, and 215 are a first group in a separate space of area 245 than the second group of users 220, 225, 230, and 235. Computer 120 may then employ the recognition of groups to generate visual representations (instantaneous or time-averaged) of features of the group and its communications. It should be appreciated that groups can simultaneously exist in many locations and are not constrained by building walls or geography.

In one embodiment, environment 200 comprises radio devices 255 and 260 used for communication with user devices and radio base station 115. Radio devices 255 and 260 may or may not be networked with radio base station 115 to provide additional coverage or range for radio base station 115. For example, radio devices 255 and 260 may be antennas or radio repeaters for radio base station 115. In one embodiment, radio devices 255 and 260 are wireless routers for computer networking. Computer 120 may employ radio devices 255 and 260 to determine a geographic location of a user. Radio devices 255 and 260 and transceivers 145, 150 and 155 may each have the same capabilities and features as one another.

The geographic location or position of a user may be determined by computer 120 receiving periodic clues or evidence of the geographic location of the user device and then computer 120 infers or deduces the geographic location based on the evidence or clues. For example, the user device associated with user 205 may receive a plurality of signals from radio base station 115 and radio devices 255 and 260. Each signal has a unique signature at the current position of user 205. The signatures of each source are periodically sent to computer 120 or as a component characteristic of any communication. Computer 120 may then determine the geographic position of user 205 based on the signatures of the sources it reports. In one embodiment, the user device knows its geographic position based on geographic position component which is part of the user device. The geographic position component may be a component device or chip that employs the global positing system, other satellite navigation system, inferred signals, radio signals or RFID signals for determining a geographic location or position. A user device with a geographic position component may transmit the determined geographic position to computer 120 periodically or as part of a communication. Thus computer 120 may know the location of a user at a given time based on the geographic position of the device associated with the user.

In one embodiment, user 265 interfaces with computer 120 to use the present technology to optimize communications. Computer 120 may determine and display performance metrics or visual representations regarding communications to user 265. User 265 may then use the performance metrics and visual representations to make decisions. For example, user 265 may be a manager of associates who can identify that a customer has asked for assistance at a given location but no associates have responded. The manager may then use the present technology to request an associated to assist the customer. In one embodiment, user 265 is able to directly use computer 120 and radio base station 115 to communicate with other users by individual identification, location groupings or contextual groupings.

In one embodiment, user 265 interfaces with computer 120 to use the present technology to optimize geographic location. User 265 may be a customer and requests help from computer 120. Computer 120 determines the associate nearest the location of user 265 and provides the current and updated location of user 265 until intercepted by the associate. In one embodiment, user 265 may request help verbally, not engaging computer 120, and that request is heard by all nearby associates whose context is "not engaged with shoppers" or as otherwise determined by the policy.

In one embodiment, computer 120 derives performance metrics, business metric or metric from the communications between users. The metrics may be used to generate visual representations. The metrics and/or visual representations may be employed to make decisions. The metrics and visual representations may be sent to another computer system or device. A metric may be based on the behavior of a user, the spoken words of the user, the context of the user, the location and movement of the user, information carried by the tone and quality of voice, and the user's signaled communications.

A sales performance metric may be determined by linking sales with users, measuring busy (or "engaged with shopper") times of users, and ascertaining busy status of user. The busy status of a user may indicate that the user is engaged in a communication, a task, assisting a customer, listening to information or otherwise occupied. A response time metric may also be determined by measuring the time it takes to answer a user's question, how long it takes to receive assistance after asking for it, or how long it takes to arrive at a requested location. A customer satisfaction metric may also be derived based on the text of the customer's communication. A task performance metric may be determined by measuring the length of time an associate is currently engaged in performing said task, including noting pending and completed tasks. Metrics may be used by a manager to reward good behavior or correct undesired behavior. Additionally, because the communications and other audio information have been recorded, the communications may be used in training as examples.

Visual representations may be described as communication traffic intensity maps between users and/or groups such as who talks to whom, how frequently and at what time of day; who asks questions and who responds; who responds to tasks, when and how long it took to respond; and who has listened to which training podcasts, where they listened and when. Visual representations may also be described as location maps such as, a status of when users indicate that they are engaged, busy or available, when users ask questions; quiet areas where no communications or engagements are occurring; where users are not located; where selling tips were left and by whom; location-based-tasks and the times it takes to complete them; a path of where users have traveled geographically; and a map of the environment. With this observation platform for structuring communications, a more complete observation of many of the events in the interaction between and among all users can be observed, cataloged, and analyzed, providing a great deal of useful information to any manager of the overall process.

Operations of Using Structured Communications in an Observation Platform

FIG. 3 is a flowchart illustrating process 300 for using structured communication in an observation platform in accordance with one embodiment of the present technology. Process 300 may also be described as disciplining communications in an observation platform. In one embodiment, process 300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 300 is performed by the components of FIG. 1A, 1B, 1C or 2. In one embodiment, the methods may reside in a computer usable storage medium having instructions embodied therein that when executed cause a computer system to perform the method.

At 302, a signal from a first communication device is received at a second communication device associated with a computer system, wherein a first characteristic of the signal corresponds to an audible source and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual/environmental information may include user status (e.g., engaged or on-break) and/or background noise levels.

At 304, a first user associated with the first communication device is recognized at the computer system.

At 306, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is a command for the computer system to perform. In one embodiment, the signal is encrypted or encoded uniquely with respect to the first communication device. The context information may be a command to the computer system. For example the computer system may be commanded to access a database in response to a query or may be given information to store for future reference.

In one embodiment, the information is a command and the command may be issued verbally by a user in a communication. For example, a user may speak into a communication device the phrase "hello everybody" thus the communication is the spoken phrase and the computer system may derive that the communication is to be sent to everybody. The computer system then relays the signal to everybody associated with the communication observation platform. In another example, the communication may be the phrase "hello Bob." The computer system derives that the destination of the communication is Bob; the communication is then relayed only to Bob.

The Table below shows examples of Communication Phrases and Derived Context information. Specific examples using sample vocabulary are given as well as more general cases indicated by the brackets [ ].

| Communication Phrase | Derived Context Information |
|---|---|
| "Hello Everybody" Hello [Group] | The communication is to be relayed to a group defined as "everybody" and anyone may respond. Context information such as "engaged" may limit those who hear and may respond to the "Hello" phrase. |
| "Hello Bob" Hello [Person] | The communication is to be relayed to an individual identified as "Bob" and only "Bob" hears the message and is able to respond. Context information such as "engaged" may result in the computer providing additional information to the caller such as the state of the user (e.g., "engaged") and other factors such as location. |
| "Hello Workshop" Hello [Location] | The communication is to be relayed to everyone associated with the "Workshop" location. Context information such as "engaged" may limit those who hear and may respond to the "Hello" phrase. |
| "Hello Process Experts" Hello [Group] | The communication is relayed to all identified as the group, "Process Experts." These people or machines may be physically located in any region or environment. Context information such as "engaged" may limit those who hear and may respond to the "Hello" phrase. |
| "Urgent Bob" or "Interrupt Bob" Interrupt [Person] Interrupt [Group] Interrupt [Location] | The communication is an urgent communication to be relayed to "Bob." Such a command may interrupt "Bob" if he is "engaged" or communicating with others or the system as defined by the operator of the environment. Once interrupted, communication is between the caller and original user (i.e., Bob) and may or may not include others who may have been talking with Bob at the time. |
| "Message Bob" Message [Person] Message [Group] Message [Location] | Leaves a message that persists for a pre-determined interval. Messages for groups are heard as persons become available. Messages for locations are heard as persons become available or enter the location area. Special cases for 'messages" include delivering audio information to groups such as Marketing Departments, Buyers, Help Desks, Websites, Technical Support or Product improvement requests. |
| "Announcement Everybody" Announcement [Group] | The communication is to be relayed to "everyone" as a bulletin. Those users who are engaged or not yet on the system will hear the bulletin when they become available. |
| "Selling tip for the side hallway" Announcement [Location] | The communication is to be relayed to those who are within or enter the side hallway as an announcement. No response is anticipated. |
| "Absolute Announcement for Maintenance Team" Absolute Announcement [Group] or [Location] or [Person] | The communication is delivered to all who are available and in the proper context. A response is mandatory. The system records the time, location, user and spoken response for later analysis or storage. |
| "Where is Steve" Where is [Person] Where is [Group] | The communication is a command to determine a geographic location of Steve and to send a message back to the communication device from the computer system that speaks the response. The response may also include contextual information such as "Steve is available" or Steve is engaged" or other information from other sources such as "Steve is on break." Steve does not need to hear that his status was being probed, although it is possible to alert him. |
| "Who is near the central hallway" Who is near [Location] | The communication is a command to determine who is geographically located near the central hallway region and to send a message back to the communication device from the computer system that speaks the response. The response may include additional contextual information for the persons in that location. |
| "Go to simple menu" Command [profile] | The communication is a command for the computer system to go to the simple menu profile and to send a message back that speaks the phrase "you will now go to simple menu." This feature allows individual users to move into different command, control and skill level profiles within the system. |
| "Does anyone know if we have . . . ?" Spoken String | Some formats of commands are natural to the users, but not is a structured speech pattern. In this case, the words, "Does anyone know . . ." may trigger the computer to send this message to group of people who |

-continued

| Communication Phrase | Derived Context Information |
| --- | --- |
| | know where things are. Additional contextual information may limit that group to a department or location. |
| Lost sale report | Initiates a ser of questions to determine the reason for a lost sale. Typical categories are: stock-outs, selection limits (e.g., could have sold one in blue), or competitive win (e.g., they have this for 20% less on Amazon). |
| Activity Report | Queries the door counter system for shopper arrival and density information. |
| Goal Report | Provides information from POS systems regarding the financial performance of the sales associates. |
| Message to Tech Support | Connects the communication device to technical support that may be located physically remote from the observation platform. |

The phrase "Go to simple menu" may be a command to enter a different menu structure for such activities as new-user learning, learning about products or business, listening to communications, or set-up functions such as group participation and default settings for the individual.

At 308, a geographic location of the first communication device is determined based on the second characteristic of the signal and at least one other source of information. For example, the at least one other source of information may be a router that the signal is routed through, a signal strength of the signal, information from the second communication device, etc.

At 310, a copy of at least one characteristic of the signal is stored in a storage medium and is made available for performance metric analysis. In one embodiment, the performance metrics are key performance metrics. At least one characteristic may be, but is not limited to, a time stamp, engaged, available status, a message, a voice file, a location, a signal signature, a type of message, text corresponding to a message, commands used to initiate the message, other contextual information about the user and an identity of the path the signal was routed through.

At 312, instructions are received at the computer system comprising the policies or rules for the relaying the signal to the destination derived from the context information. The policies may instruct to whom and to how the communication is to be relayed. For example, information derived from a communication may command that the communication be sent to everyone associated with the geographic location of "Workshop." However, the policies may instruct that the communication is only relayed to those associated with the "Workshop" who are designated as available or not busy. The policies may also comprise a predetermined time or a lifetime in which a response may be relayed to an available communication device.

At 314, the signal is relayed to a destination derived from the context information. The destination may be another user or a plurality of user or the computer system itself. The destination may be located outside of a radio range associated with the second communication device or be otherwise physically remote relative to the second communication device.

At 316, a data entry and visual representation is generated indicating the geographic position of the first communication device with respect to a geographic environment in which the first communication device is located. For example, the visual representation may be a map depicting the location of users or where users have been. The data entry and visual representation may include a status indicator of the user such as whether the user is busy or available.

FIG. 4 is a flowchart illustrating process 400 for using a structured communication in an observation platform in accordance with one embodiment of the present technology. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 400 is performed by the components of FIG. 1A, 1B, 1C or 2. In one embodiment, the methods may reside in a computer usable storage medium having instructions embodied therein that when executed cause a computer system to perform the method.

At 402, a signal from a first communication device is received at a second communication device, wherein a first characteristic of the signal corresponds to a voice of a first user and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual/environmental information may include user status (e.g., engaged or on-break) and/or background noise levels.

At 404, the first user associated with the first communication device is recognized.

At 406, text or machine code related to the voice of the first user is recognized.

At 408, context information from the text or machine code is derived at a computer system associated with the second communication device, wherein the context information corresponds to a command related to the text or machine code.

At 410, the text or machine code is stored in a storage medium for developing performance metrics.

At 412, the signal is relayed to a destination derived from the context information. The destination may be located outside of a radio range associated with the second communication device or be otherwise physically remote relative to the second communication device.

FIG. 5 is a flowchart illustrating process 500 for observing and recording users of communication devices in accordance with one embodiment of the present technology. In one embodiment, process 500 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 500 is performed by the components of FIG. 1A, 1B, 1C or 2. In one embodiment, the methods may reside in a computer usable storage medium having instructions embodied therein that when executed cause a computer system to perform the method.

In one embodiment, process 500 is a management observation tool for keeping track of mobile human resources and collecting data on their activities.

At 502, a first user associated with a first communication device and a second user associated with a second communication device are recognized at a central computer system.

At 504, geographic locations of the first communication device and the second communication device are tracked at the central computer system. In one embodiment, tracking means storing data about location and any spoken information.

At 506, a communication between the first communication device and the second communication device are tracked and recorded at the central computer system, wherein at least a portion of the communication is an audible communication.

At 508, features of the communication are identified at the central computer system. Features may be described as characteristics or data regarding the communication itself. The features may be user status such as engaged/available, location of a user, communication history of the user, context of the communication, keywords used in the communication, a classification of the communication, and time stamps.

At 510, the features are made available to a manager, operations staff or operations machines for making decisions or informing the users that new actions are requested.

FIG. 6 is a flowchart illustrating process 600 for characterizing communications in a group of users in accordance with one embodiment of the present technology. In one embodiment, process 600 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 600 is performed by the components of FIG. 1A, 1B, 1C or 2. In one embodiment, the methods may reside in a computer usable storage medium having instructions embodied therein that when executed cause a computer system to perform the method.

At 602, a group of users is recognized, at a computer system, wherein each user of the group of users are associated with communication devices. The group of users may be recognized based on a classification of the user or a geographic location of the users. For example, a classification of the users may be whether the user is an associate or a customer in a retail setting.

At 604, a communication between the communication devices is recorded at the computer system, wherein at least a portion of the communication is an audible communication. In one embodiment, at least a portion of the communication is a pre-recorded audible communication.

At 606, geographic locations of the communication devices are recorded at the computer system. The location may be determined based on signal signatures or other "clues" from other devices sent periodically or with the communication indicative of the location.

At 608, features are identified based upon the communication. Features may be described as characteristic or data regarding the communication itself. The features may be a user status such as engaged/available, location of a user, communication history of the user, context of the communication, a classification of the communication, a frequency of communications between two users, a length of a communication, keywords used in the communication, a response time to a communication and time stamps.

At 610, a visual representation of the features is generated at the computer system. The visual representation may depict when a user of said group of users is engaged in said communication, when a user of said group of users asks a question in said communication, who responds to the question, where each user of said group of users are located, and where said group of users are not located. Alerts, either visual or verbal, may be generated depending on the rules and policies established by the system operators.

At 612, the visual representation is made available to a manager, operations staff or operations machines for making decisions or informing the users that new actions are requested.

FIG. 7 is a flowchart illustrating process 700 for using structured communication in a plurality of observation platforms in accordance with one embodiment of the present technology. Process 700 may also be described as disciplining communications in an observation platform. In one embodiment, process 700 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 700 is performed by the components of FIG. 1A, 1B, 1C or 2. In one embodiment, the methods may reside in a computer usable storage medium having instructions embodied therein that when executed cause a computer system to perform the method.

At 702, a signal in a first observation platform is received from a first communication device at a second communication device associated with a computer system wherein a first characteristic of the signal corresponds to an audible source and a second characteristic of the signal corresponds to information indicative of a geographic position of the first communication device, and wherein the second observation platform is associated with a radio range. Additional characteristics of the signal may include contextual information and environmental information. For example, the audible source may be the voice of a user, the signal characteristics may include signal signature information and contextual/environmental information may include user status (e.g., engaged or on-break) and/or background noise levels.

At 704, a first user associated with the first communication device is recognized at the computer system.

At 706, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is a command for the computer system to perform. In one embodiment, the signal is encrypted or encoded uniquely with respect to the first communication device. The context information may be a command to the computer system. For example the computer system may be commanded to access a database in response to a query.

At 708, the signal is relayed from the computer system to a second computer system associated with a second observation platform via a computer network At 710, the signal is relayed to a destination in the second observation platform via the second computer system derived from said context information.

Figure 8:
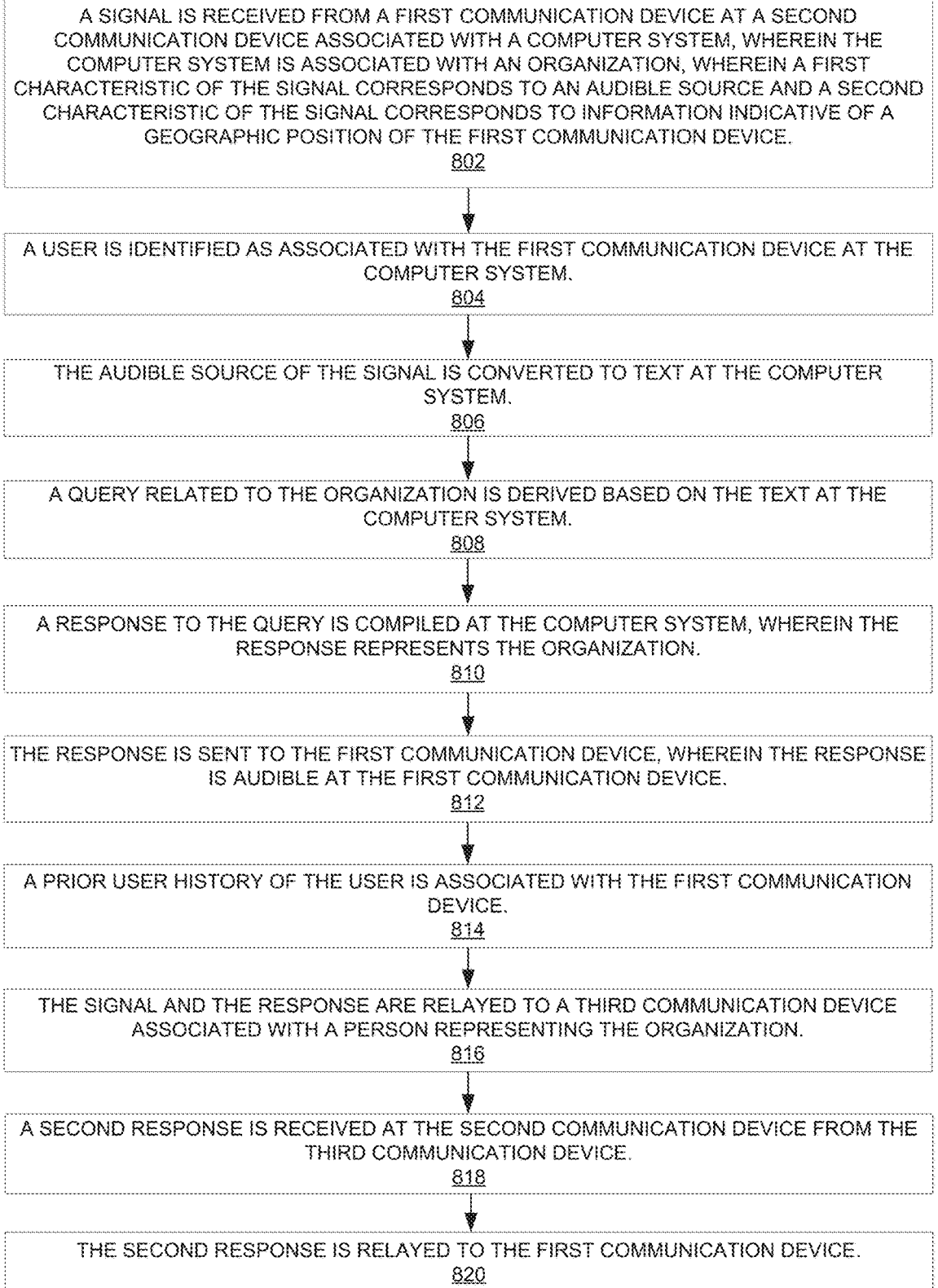
FIG. 8 illustrates a flowchart of an example method for performing communications in an of observation platforms in accordance with embodiments of the present technology.

FIG. 8 is a flowchart illustrating process 800 for performing structured communications in an observation platform in accordance with one embodiment of the present technology. Process 800 may also be described as disciplining communications in an observation platform. In one embodiment, process 800 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 800 is performed by the components of FIG. 1A, 1B, 1C or 2. In one embodiment, the methods may reside in a computer usable storage medium having instructions embodied therein that when executed cause a computer system to perform the method.

At 802, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual or environmental information may include user status (e.g., engaged or on-break) and/or background noise levels. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein.

At 804, a user is identified as associated with the first communication device at the computer system. In one embodiment, 804 only identifies that there is a user employing the communication device. The actual identity of the user may remain anonymous to the computer system or the user may be identified. The user may be identified using one or a combination of several different techniques. The user may be identified via a unique signature of the communication device associated with the user. For example, the user's communication device may be a smart phone running an application. The smart phone may be the user's personal property and is always associated with the user. In one embodiment, the user may be authenticated upon activation of the communication device or the application. For example, a user may enter an environment, activate a communication device and then give user credentials that identify the user. This may accomplished via voice commands or text inputs. In one embodiment, the user credentials are associated with a user profile, but the actual identity of the user remains anonymous. In one embodiment, the user may activate a communication device and self-identify. Identifying a user may be automatic taking place without the user's knowledge, or may require the user to acknowledge or give permission for the computer system to identify the user.

At 806, the audible source of the signal is converted to text or machine understandable language at the computer system. This may occur using speech-to-text techniques or other techniques employed by computer systems.

At 808, a query related to the organization is derived based on the text or understanding at the computer system. The query may be any number of queries from the user. The user may ask for general assistance or may ask a more specific question such as whether an item is in stock, where an item is located, what sales are taking place, technical details or features regarding an item.

At 810, a response to the query is compiled at the computer system, wherein the response represents the organization. For example, the response relates to the purpose of the organization. In one embodiment, the response is regarding a location or status of a person or an item within the organization. The computer system may access a database to complete the response. The database may be a local database such as an inventory of a local store, or may access a database in part of a larger network associated with the organization, or may access a database associated with the Internet. In one embodiment, the computer system performs a key word search of the Internet using a search engine to complete the response.

At 812, the response is sent to the first communication device, wherein the response is audible at the first communication device. In one embodiment, the response is initially a text response that is converted from text to speech. The conversion may occur at the computer system such that a signal with an audible portion is sent to the first communication device, or a text message may be sent to the first communication device where it is converted to speech. The response may be recorded by the organization in a computer system and may also be sent to a person associated with the organization such as a manager or associated. Thus, a person associated with the business may monitor the responses of the computer system and may be aware of the needs or requirements of the user associated with the first communication device.

At 814, a prior user history of the user is associated with the first communication device. The user history may be a user profile that may or may not identify the user. The history may have a list of all the transactions of this user associated with the organization. The history may also comprise information provided by the user such as likes and dislikes or preferences regarding which person the user wishes to be served by while in the organization.

At 816, the signal and the response are relayed to a third communication device associated with a person representing the organization. The person associated with the organization may be a consultant, an employee, an associate, a sales associate, a civil servant, a volunteer or a manager. The third communication device may be a handheld device and may or may not be the same type of device as the first communication device.

At 818, a second response is received at the second communication device from the third communication device. For example, the person representing the organization may respond using a signal that may have an audible voice portion a text portion or both.

At 820, the second response is relayed to the first communication device. The computer system may initiate a virtual voice connection between the first communication device and the second communication device.

Figure 9:
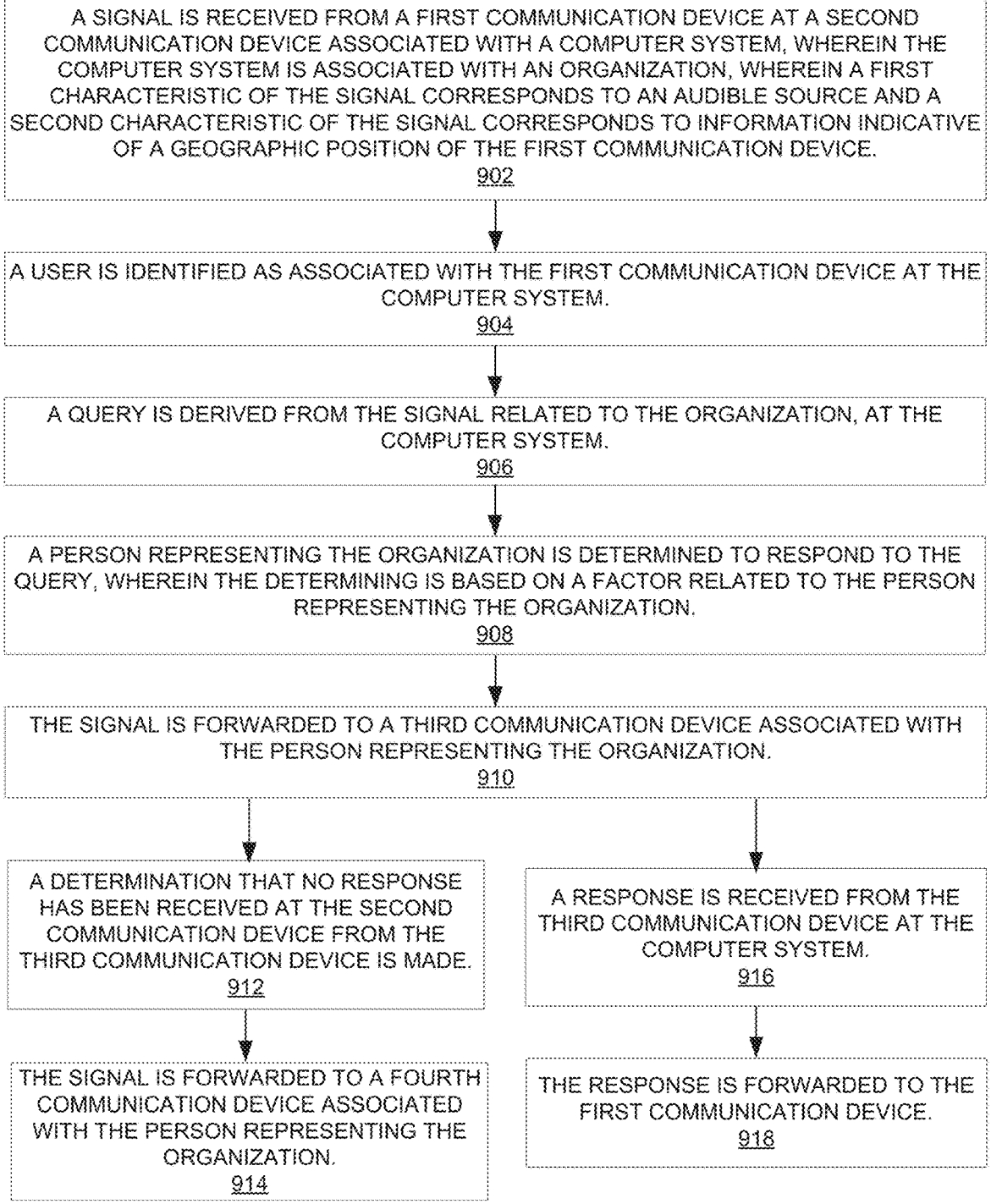
FIG. 9 illustrates a flowchart of an example method for performing communications in an of observation platforms in accordance with embodiments of the present technology.

FIG. 9 is a flowchart illustrating process 900 for performing structured communications in an observation platform in accordance with one embodiment of the present technology. Process 900 may also be described as disciplining communications in an observation platform. In one embodiment, process 900 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 900 is performed by the components of FIG. 1A, 1B, 1C or 2. In one embodiment, the methods may reside in a computer usable storage medium having instructions embodied therein that when executed cause a computer system to perform the method.

At 902, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may the voice of a user, the signal characteristics may include signal signature information and contextual or environmental information may include user status (e.g., engaged or on-break) and/or background noise levels. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein.

At 904, a user is identified as associated with the first communication device at the computer system. The actual identity of the user may remain anonymous to the computer system or the user may be identified. The user may be identified using one or a combination of several different techniques.

At 906, a query is derived from the signal of the first device related to the organization, at the computer system. The query may be any number of queries from the user. The user may ask for general assistance or may ask a more specific question such as whether an item is in stock, where an item is located, what sales are taking place, technical details or features regarding an item or requesting general assistance.

At 908, a person representing the organization is determined to respond to the query, wherein the determining is based on a factor related to the person representing the organization. The factor may also be described as a characteristic. The factor may be related to the query from the user. For example, the user may ask a question regarding an item in a given department. The determining may be based on who is associated with the given department. The factor may also be based on the status of the person, the availability of the person, the proximity of the person to the user, geographic location of the person, knowledge level of the person, authority level of the person, ability of the person, or a combination of factors. The determining may determine that a plurality of persons qualify to respond. The signal may then be forwarded to one of the plurality, a subset of the plurality, or all of the plurality of persons.

At 910, the signal is forwarded to a third communication device associated with the person representing the organization.

At 912, a determination that no response has been received at the second communication device from the third communication device is made. 912 may occur after 910 in an embodiment where 916 and 918 do not occur. However, 912, 914, 916 and 918 may all occur in one embodiment. Such determination may occur after a pre-determined time period has passed with no response from the third communication device. Such a determination may or may not preclude the third communications device from later responding.

At 914, the signal is forwarded to a fourth communication device associated with the person representing the organization. 912 and 914 may be repeated forwarding the signal to additional communication devices until it is determined that a person representing the organization has responded via a communication device. Alternatively, 910 and 914 may forward the signal to a plurality of communication devices associated with a plurality of persons representing the organization. Once any one of the plurality of persons responds, the person and the user may be placed into a communications channel via their communications devices. The communications channel may be private in the sense that the other members of the plurality of persons representing the organization do not hear subsequent communications over the communications channel. This may be accomplished via the computer system associated with the second communications device. The subsequent communications may all be relayed or forwarded between the user and the person representing the organization via the second communication device and the associated computer system. In one embodiment, the communication channel is open to all members of the plurality of persons representing the organization. In one embodiment, the communication channel is open to a subset group of the plurality of persons representing the organization. For example, the subset group may be only persons who are determined by the computer system to have knowledge regarding the query made by the user or may only be persons who are determined to be available, or persons who have interest in learning more about the subject, or some combination of these characteristics.

By forwarding the signal to a fourth communication device or a plurality of other devices, the circle or group of those required or enlisted to help the user is enlarged. In other words, the user may send a communication or query indicating that the user is in need of assistance. The computer system determines a first person is to assist the user, but if the first person doesn't respond, the computer system then determines a second person or a plurality of persons to assist the user. Thus the group of those responding to the assistance need increases. In one embodiment, the initial communication from the first user may go to a designated plurality and the first person to respond becomes established in a private one-on-one conversation with the first (originating) user.

At 916, a response is received from the third communication device at the computer system. 916 may occur after 910 in an embodiment where 912 and 914 do not occur.

At 918, the response is forwarded to the first communication device. 918 may occur after 916 in an embodiment where 912 and 914 do not occur. Process 900 may initiate a virtual voice connection between two communication devices where the communication is relayed or forwarded via the computer system and the second communication device. Thus the computer system and the second communication device may be described as mediating the communications.

FIG. 10 is a flowchart illustrating process 1000 for performing structured communications in an observation platform in accordance with one embodiment of the present technology. Process 1000 may also be described as disciplining communications in an observation platform. In one embodiment, process 1000 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1000 is performed by the components of FIG. 1A, 1B, 1C or 2. In one embodiment, the methods may reside in a computer usable storage medium having instructions embodied therein that when executed cause a computer system to perform the method.

At 1002, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may the voice of a user, the signal characteristics may include signal signature information and contextual or environmental information may include user status (e.g., engaged or on-break) and/or background noise levels. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein.

At 1004, a user is identified as associated with the first communication device at the computer system. The actual identity of the user may remain anonymous to the computer system or the user may be identified. The user may be identified using one or a combination of several different techniques.

At 1006, a query is derived from the signal related to the organization, at the computer system. The query may be any number of queries from the user. The user may ask for general assistance or may ask a more specific question such as whether an item is in stock, where an item is located, what sales are taking place, technical details or features regarding an item.

At 1008, a plurality of persons representing the organization are determined to respond to the query, wherein the determining is based on a factor related to the plurality of persons representing the organization.

At 1010, the signal is forwarded to a plurality of communication devices associated with the plurality of persons representing the organization. Such a series of communications may be described as a one-to-many communication. The "many" group may be default or predefined group such as all those associated with a given department or all those who are associated with a given area of expertise. Groups may also be created based on names, locations, availability or status.

At 1012, a response is received from a communication device associated with one of the plurality of persons representing the organization at the second communication device.

At 1014, the response is forwarded from the second communication device to the first communication device. Thus the communication may go from a one-to-many to a one-to-one communication.

At 1016, a communication channel is opened between the first communication device and the communication device associated with one of the plurality of persons. In other words, the communication from the first (originating) user is sent to multiple persons. The first person to respond enters into a communication channel between the first communication device and the communication device associated the person. Others who respond within a pre-determined timeframe are also included in the "channel." The communication channel may be mediated by the computer system and once all users have entered, may not be overheard by the other persons from the plurality of persons. The usefulness of this structure is that it allows ad-hoc group construction by simply announcing the intent of the group, and only those responding are tied into the private group "channel".

In one embodiment, the communication may go from a one-to-many to a one-to-few communication. The persons in the few of the one-to-few communication may be a subset of the many persons from the one-to-many. For example, the initial communication may be sent to all those persons holding communication devices. The computer system may then open a communication channel between the first person to respond where the channel is also opened to others person representing the store who are associated with a specific role or department. Thus only one person may be actively communicating with the user, but other persons may hear the communications and may join at any time. Thus the communication may not disrupt those who are otherwise not interested.

FIG. 11 is a flowchart illustrating process 1100 for sending notifications in an observation platform in accordance with one embodiment of the present technology. Process 1100 may also be described as disciplining communications in an observation platform. In one embodiment, process 1100 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1100 is performed by the components of FIG. 1A, 1B, 1C or 2. In one embodiment, the methods may reside in a computer usable storage medium having instructions embodied therein that when executed cause a computer system to perform the method.

At 1102, a signal is received from a first communication device at a second communication device associated with a computer system, wherein the computer system is associated with an organization, wherein a first characteristic of the signal corresponds to information indicative of a geographic position of the first communication device. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein.

At 1104, a user is identified as associated with the first communication device at the computer system. The actual identity of the user may remain anonymous to the computer system or the user may be identified. The user may be identified using one or a combination of several different techniques.

At 1106, a history of activities of the user associated with the organization is accessed. The history of activities may be a user history or user profile that may or may not identify the user. The history may have a list of all the transactions of this user associated with the organization. The history may also comprise information provided by the user such as likes and dislikes or preferences regarding which person the user wishes to be served by while in the organization. The computer may attempt to find the preferential associate(s) and notify them that the shopper is in the store and where they are located. The associates contacted may hear prior conversations with that shopper to refresh their memory and aid in making the shopper experience seamless.

At 1108, a geographic location of the first communication device in the organization is derived at the computer system. For example, the computer system may determine that the user is on a given aisle such as the cereal aisle in a grocery store or in a zone that may correlate to a department such as the lumber department in a hardware store.

At 1110, a notification is sent to the first communication device wherein the notification is based on the history of activity and the geographic location of the first communication device. For example, the notification may alert the user of a coupon or special on a given item in the organization that is for sale. The coupon or special may be for an item that the user previously purchased which knowledge was obtained by the computer system based on the history of user activity. The notification may be any number of notifications including a text message or an audible message and the notification may be accompanied by an alert such as a vibration or an audible sound. The history of activity may be utilized to automatically connect communications from the user to a person with whom the user has prior interactions.

At 1112, at least a portion of the history of activities is delivered to the first communication device. Such information may be used the user to determine what items the user previously purchased. For example, the user may wish to purchase the same item again but does not remember the exact details of the item or the user may wish to avoid purchasing the same item. The user may also use the information to identify a person representing the organization with whom the user wishes to interact with again. For example, the user may have had a pleasant experience with a given sales associate and know that sales associate can meet the user's needs. In one embodiment, step 1112 is not performed as part of process 1100.

Process 1100 may be used in conjunction with a loyalty program involving lotteries or coupons that may be in existence before the communications platform is implemented in the organization or may be created based on the communications platform or a combination of the two.

FIG. 12 is a flowchart illustrating process 1200 for performing structured communications in an observation platform in accordance with one embodiment of the present technology. Process 1200 may also be described as disciplining communications in an observation platform. In one embodiment, process 1200 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1200 is performed by the components of FIG. 1A, 1B, 1C or 2. In one embodiment, the methods may reside in a computer usable storage medium having instructions embodied therein that when executed cause a computer system to perform the method.

At 1202, a signal is received from a first communication device at a second communication device associated with a computer system, wherein the signal comprises a mandatory message for a third communication device. For example, the mandatory message may be a message that is required to be delivered to each employ associated with an organization and an acknowledgement received and recorded. The requirement may be a legal requirement to notify employees of certain information or may be requirement implemented by the organization. The mandatory message may be delivered as an audible message or a text message. The mandatory message may also direct a user to a location where more information may be found.

At 1204, the signal is forwarded with the mandatory message to the third communication device associated with a user such that a receipt of the mandatory message at the third communication device will lock features of the third communication device until the mandatory message has been acknowledged by the user. For example, the third communication device may be a handheld device and may have features such as the ability to communicate with other devices or the ability to connect to other devices such as a computer system and may be used to access information from a database. Upon receipt of the mandatory message, some or all of the features of the communication device may be locked meaning that the user not able to access the features. For example, upon receipt of the mandatory message the communication device may lock or disable the ability to communicate with other devices.

At 1206, an acknowledgement of the mandatory message is received from the third communication device at the second communication device. The acknowledgement may be generated manually by the user of the third communication device or may be automatically generated. For example, upon receipt of the mandatory message, the third communication device may display an option to access the mandatory message. Once the user accesses the message, the acknowledgement may be sent automatically, or an option may be presented to the user to send the message. In one embodiment, the user is required to create an acknowledgement message to send back. The acknowledgement message may be a text or audible message created by the user.

At 1208, the acknowledgement of the mandatory message is forwarded from the second communication device to the first communication device. In one embodiment, the locked features of the third communication device may be unlocked in response to the user accessing the mandatory message. In one embodiment, the locked features of the third communication device may be unlocked in response the computer system receiving the acknowledgement. In one embodiment, the locked features of the third communication device may be unlocked in response to the user of the first communication device receiving the acknowledgement.

At 1210, the signal with the mandatory message is forwarded to a plurality of communication devices associated with a plurality of users such that a receipt of the mandatory message at each of the plurality of communication devices will lock features of each of the plurality of communication devices until the mandatory message has been acknowledged by each of the plurality of users.

At 1212, a characteristic of the forwarding the signal with the mandatory message is tracked. In one embodiment, the system tracks the time the message was sent, when it was heard by the user, and when and where the user was located when they acknowledged. Associated with the statistical information is a speech file of what the user said. This feature is ideal for communicating policy or liability information and assuring that that information was received and understood. It should be appreciated that there is more than one type or class of mandatory messages. Each type or class may have different requirements for the delivery and/or acknowledgement.

FIG. 13 is a flowchart illustrating process 1300 for structured training in an observation platform in accordance with one embodiment of the present technology. Process 1300 may also be described as disciplining communications in an observation platform. In one embodiment, process 1300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1300 is performed by the components of FIG. 1A, 1B, 1C or 2. In one embodiment, the methods may reside in a computer usable storage medium having instructions embodied therein that when executed cause a computer system to perform the method.

At 1302, a signal is received from a first communication device at a second communication device associated with a computer system, wherein a first characteristic of the signal corresponds to supplemental information useful for the instruction and the training. Additional characteristics of the signal may include information indicative a geographic location of the first communication device, a characteristic corresponding to an audible or sub-audible source, contextual information and environmental information. For example, the audible source may be the voice of a user, the signal characteristics may include signal signature information and contextual or environmental information may include user status (e.g., engaged or on-break) and/or background noise levels. The supplemental information may be useful for establishing and running a process for delivering information, alerts, instruction or a training module to an individual or group of individuals. The supplemental information may include information related to a location determination, environmental surroundings including audio and sub-audible information, user habits, user identification, button presses, or other external influences of the system.

The first communication device may be a handheld device that is capable of sending and receiving signals and may comprise a display, a microphone and a speaker. The first communication device may be owned by an organization and issued to the user or may be the user's personal property such as a smart phone executing an application. The second communication device may be a radio base station as described herein may be a second handheld device.

At 1304, a user associated with the first communication device is identified at the computer system. The user may be identified as an employee, manager, or other person associated with an organization employing the observation platform. The user may be identified by the user's name, a username, an employee number, etc. The identity of the user may be employed to select an appropriate training module in that is sent at step 1308. For example, there may be a list of training modules that the user is required to complete. The computer system may be tied to a database that tracks which training modules have been completed by the user and thus the computer system may send a training module to the user that has not yet been completed.

At 1306, a status of the user is determined wherein the status comprises a readiness of the user, at the computer system, based on the supplemental information and information sent from the first communication device to the second communication device. For example, the user may indicate to the computer system the status of the user. The user may indicate that she is available for training, or may indicate that she is engaged, unavailable, or busy and should not receive a training module. The user may manually indicate this status by pressing buttons on the first communication device or by issuing voice commands to the device. The computer system may also infer or determine that a user is busy based on the communication signals sent by the communication device associated with the user. For example, if the user is communicating with another device then the computer system may infer that the user is busy and not available for training. In one embodiment, the user may schedule a time for training. For example, the user may schedule training at the beginning The geographic location of the user or the first communication device may be employed to determine which training module is to be sent to the device. For example, the user may be an associate in a retail setting with multiple departments. The associate may be required to complete training modules associated with each of the departments. The computer system may determine that the associate is available for training and that the associated is located in the lumber department. The computer system may then determine that the training module for the lumber department should be sent to the first communication device. Moreover, the location of the user may indicate the user's availability for training. For example, if an employee is located in a break room then it may be automatically determined that the employee is available for training.

At 1308, instructional information is sent to the first communication device in response to a determination that the status of the user indicates a likelihood of readiness to receive the instructional information, wherein the instructional information is for use by the user in conjunction with the first communication device. The instructional information may be a training module or data on how a user may obtain a training module. A training module may be instructional information designed to teach or train the user. The instructions may be related to the use and features of the first communication device in the observation platform. The instructions may also be related to the user's education of information related to an organization employing the observation platform. For example, the organization may be a retail setting and the user is a sales associate. The training module may then be related to the policies and procedures of the retail setting or information regarding the products being sold. The training module may comprise content that is audio, video, graphical, textual, or any combination thereof. The content may be displayed or played using the first communication device. For example, the audio may be played into headphones connected to the first communication device worn by the user. Textual and other visual data may be displayed on a screen of the first communication device.

The training module may be streamed to the user. In other words, the first communication device may not receive all of the content in one download or transmission. The first communication device may receive a stream of data and display or play the stream of data as it is received without saving the data into storage at the device. In such an example the user may have the ability to pause or suspend the training. In one embodiment, the user may be available and begin a training module but may become engaged or unavailable part way through completing the training module. The user may indicate this status to the computer system and then resume the training module at a time when the user is available again. The computer system may store the partial completion of the training module and where the user left of in the stream. The training module need not be streamed to the communication device and may instead be downloaded to the communication device from the computer system or another data base. Alternatively, the communication device may be pre-loaded with training modules before it is employed by the user. The pre-loading or downloading may be accomplished via well known techniques for transferring data between two networked electronic devices.

The training module may be described as an instructional audio stream, or audio "infomercials," so that associates, supervisors managers or other users can learn more about products, culture or brand identity. This training information can be distributed based on priority and user location. For example a non-urgent product snippet might only play when an employee enters the break room or the stock room. A priority message might play whenever the employee is not "engaged" with a shopper. Another way training "podcasts" can be heard is by the employee requesting a training stream via speech command. In this case, the employee can hear the stream in the background while going about her business and can suspend the training any time by pressing the "engaged" button.

The use of the training module may be described as a virtual training room where detailed information can be delivered upon command. A button action such as engaged/interrupt would suspend training if shoppers need assistance or a task needs concentration. Users could call up new information or continue where they left off with older information. The Training Room could also be a repository for manufacturer or branded information. The retailer or a third party could sell space in the training room to the manufacturers for increasing brand awareness and knowledge. Analytics or tracking may indicate what was heard, when, where and by whom. Recommendations for learning could be associated with where associates spend their time, the context of communications or the groups they are associated with. Contextual and location information is used to share relevant information with associates at the right time and place. The information or modules may be prioritized so that the modules can play during the best times for the associates to hear it such as when they arrive or go on break. In another example, product training can be delivered to non-engaged associated in the vicinity of products, motivational information can be scheduled for delivery at certain times of day, new feature introductions can be delivered upon device authentication, management information can be delivered to management groups, communication usage tips can be delivered as employees enter the break room. Another example is that the retailer could sell ear space to manufacturers with higher value depending on the priority with which it is delivered to the associates.

At 1310, the computer system tracking a use of the instructional information in conjunction with the first communication device. The computer system may be capable of tracking which users have completed training modules including the time and place the training modules were completed. Such information could be used by management in a retail setting to determine which users are completing required training. Additionally, managers may use information to determine if the training modules are being used in the intended manner. For example, an employee may always complete training modules in the same location and not in the location they were intended to be completed in. Thus, observational metrics will show who hears what, where and when FIG. 14 is a flowchart illustrating process 1400 for monitoring communications in an observation platform in accordance with one embodiment of the present technology. Process 1400 may also be described as disciplining communications in an observation platform. In one embodiment, process 1400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1400 is performed by the components of FIG. 1A, 1B, 1C or 2. In one embodiment, the methods may reside in a computer usable storage medium having instructions embodied therein that when executed cause a computer system to perform the method.

At 1402, at least one signal of a plurality of communication signals is monitored via a computer system between a first communication device and a second communication device wherein a first characteristic of the at least one signal corresponds to an audible source and a second characteristic of the at least one signal corresponds to information indicative of a geographic position of the first communication device. Additional characteristics of the signal may include contextual information and environmental information. For example, the audible source may be the voice of a user, the signal characteristics may include signal signature information and contextual or environmental information may include user status (e.g., engaged or on-break) and/or background noise levels. The first communication device may be a handheld device that is capable of sending and receiving signals and may comprise a display, a microphone and a speaker. The first communication device may be owned by an organization and issued to the user or may be the user's personal property such as a smart phone executing an application. The second communication device may be a radio base station as described herein may be a second handheld device.

The monitoring may be repeated or may occur simultaneously for a plurality of communication signals. Such signals may be from a plurality of communication devices. For example, the first communication device may communicate with a plurality of other devices, or other devices not including the first communication device may all be communicating a multiple number of times within the observation platform. Process 1400 may occur for a single signal or a plurality of signals.

At 1404, a determination is made that a user associated with the first communication device is experiencing an issue with a feature of the first communication device. An issue may be defined to be any number of difficulties, errors, malfunctions, or other problems experienced by the user who is using the first communication device. In one embodiment, the user may not know how to properly use the device or all of its features. For example, the user may not know how to send a message, how to receive a message, how to send acknowledgements, how to change the volume, how to indicate a status of the user, etc. The user may or may not know that they are experiencing such an issue.

In one embodiment, the user may be under-utilizing the device by not using all of the available features. For example, the user may not know that they are able to ask for assistance via the device, or may not know what type of assistance that they may request. The computer system may determine that a user is in need of assistance based on a geographic location or a pattern of geographic locations of the user within a setting. The computer system may then determine that the user is under-utilizing the device to ask for assistance.

In one embodiment, the computer may determine that the user is re-issuing the same commands to the device and determine that the result desired by the user has not been achieved. The computer system may then determine that a training module may assist the user in learning which alternative commands may be issued to achieve the results desired by the user. For example, the training module may teach the user specific phrases that may be used to achieve desired results. The training module may inform the user regarding the communications phrases described in process 300 herein. In other words, if the observation platform monitors a user having difficulty with a command or function, it can automatically send a short audio script to the user with corrective actions.

In one embodiment, the computer system determines or anticipates that the user is in need of tech support. The anticipation may be based on commands issued to the device by the user, a geographic location of the user, speech to text conversion of audible portions of the signal with an algorithm searching for key phrases in the text, or any combination thereof. The tech support may be offered in the form of a training module or live audible support via the first communication device in contact with a tech support representative. The tech support representative may be associated with the organization employing the observation platform or may be a third party.

At 1406, an invitation for a training module is sent from the computer system to the first communication device, wherein the training module is for use by the user in conjunction with the first communication device. The invitation to the device may be audible, textual, visual, or a combination thereof. The invitation may offer more than one training module options to the user. The user may then select the most relevant option. Live tech support may also be offered to the user. The training modules may instruct the user in how to use the communication device. The training modules may be similar to the training modules described in process 1300.

At 1408, the training module is sent to the first communication device in response to receiving an acceptance of the invitation. For example, the user may audible accept an invitation using key phrases. The key phrases may be one of a list of key phrases that the computer system will recognize or may be given to the user with invitation. In one embodiment, the user presses a button on the first communication device to accept the invitation.

Process 1400 demonstrates how to use the observation platform to monitor how users behave using the platform. The result of such monitoring can reduce field support costs and can even anticipate problems before the user tries to make contact for support. User behavior monitoring improves the product and software continuously and those improvements may then be shared with other observation platform users outside of the organization which initially captured the user behavior. These improvements may be offered as a service by those supplying the observation platform to various organizations.

FIG. 15 is a flowchart illustrating process 1500 for mining data in an observation platform in accordance with one embodiment of the present technology. Process 1500 may also be described as disciplining communications in an observation platform. In one embodiment, process 1500 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1500 is performed by the components of FIG. 1A, 1B, 1C or 2. In one embodiment, the methods may reside in a computer usable storage medium having instructions embodied therein that when executed cause a computer system to perform the method.

At 1502, at least one signal of a plurality of communication signals is monitored via a computer system between a first communication device and a second communication device wherein a first characteristic of the at least one signal corresponds to an audible source and a second characteristic of the at least one signal corresponds to information indicative of a geographic position of the first communication device. Additional characteristics of the signal may include contextual information and environmental information. For example, the audible source may be the voice of a user, the signal characteristics may include signal signature information and contextual or environmental information may include user status (e.g., engaged or on-break) and/or background noise levels. The first communication device may be a handheld device that is capable of sending and receiving signals and may comprise a display, a microphone and a speaker. The first communication device may be owned by an organization and issued to the user or may be the user's personal property such as a smart phone executing an application. The second communication device may be a radio base station as described herein may be a second handheld device.

The monitoring may be repeated or may occur simultaneously for a plurality of communication signals. Such signals may be from a plurality of communication devices. For example, the first communication device may communicate with a plurality of other devices, or other devices not including the first communication device may all be communicating a multiple number of times within the observation platform. Process 1400 may occur for a single signal or a plurality of signals.

At 1504, classifications for data associated with the at least one signal are identified. The classifications may or may not be related to features or portions of the signal that are not the communication itself. In other words, the communication itself may be an audible or text message from one user to the other, but the communication also carries secondary data such as the time the communication was sent, or the location of the device when the communication was sent, etc.

In one embodiment, the classifications are related to the non-message portion of the communication and may comprise the time the message was sent, who sent the message, the length of the message, who the message was sent to, the type of data in the message (i.e. audible, textual, etc.), At 1506, the data and the classifications for the data are stored in a database. The data base may be part of the computer system or may be stored in another location accessible by the computer system. In one embodiment the data base is a MySQL data base.

At 1508, a request is received, at the computer system, for a report based on the plurality of communication signals. The request may comprise an inquiry or a request for a certain type of report. For example, the request may ask for the number of communications in the observation platform for a given period of time for all devices within the platform. Or the request may be for all instances of communications from one user including the time, length, and to whom the communication was sent. Or the request may be for all communications between two users. Or the request may be for a geographic location of a user during communications from the user. Any number of requests may be made for a report based on the message and non-message portions of the communications. Alternatively, the request may be sent to a hardware device associated with the observation platform other than the computer system that has access to the database.

At 1510, the report is generated based the data and the classifications. The report may comprise the message portion of the communication or only non-message data related to the communication that is generated based on the classifications. The report can be generated to show the frequency of communications from a user, or the frequency from one user to a second user. Movements of a user or a group of users may be inferred based on the location of the users during the communications. Such reports may be useful to make inferences about user behavior. For example, in a retail setting a manager may use the reports to infer that an associate is located in an appropriate zone of the retail setting in a give time frame and quickly responds to requests for assistance from customers. Alternatively, a manager may infer that two given associates communicate too frequently with one another and during times that they should not be communicating. It should be appreciated that the variety of reports that may be generated may be useful for a great number of purposes. In one embodiment, the reports are generated automatically in response to parameters established within the observation platform. For example, a computer system may be commanded to automatically produce a daily report for all communication associated with a given user. The report may be generated at the computer system and may be displayed at the computer system and may be sent to another device.

FIG. 16 is a flowchart illustrating process 1600 for mining data in an observation platform in accordance with one embodiment of the present technology. Process 1600 may also be described as disciplining communications in an observation platform. In one embodiment, process 1600 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1600 is performed by the components of FIG. 1A, 1B, 1C or 2. In one embodiment, the methods may reside in a computer usable storage medium having instructions embodied therein that when executed cause a computer system to perform the method.

At 1602, at least one signal of a plurality of communication signals is monitored via a computer system between a first communication device and a second communication device wherein a first characteristic of the at least one signal corresponds to an audible source and a second characteristic of the at least one signal corresponds to information indicative of a geographic position of the first communication device. Additional characteristics of the signal may include contextual information and environmental information. For example, the audible source may be the voice of a user, the signal characteristics may include signal signature information and contextual or environmental information may include user status (e.g., engaged or on-break) and/or background noise levels. The first communication device may be a handheld device that is capable of sending and receiving signals and may comprise a display, a microphone and a speaker. The first communication device may be owned by an organization and issued to the user or may be the user's personal property such as a smart phone executing an application. The second communication device may be a radio base station as described herein may be a second handheld device.

The monitoring may be repeated or may occur simultaneously for a plurality of communication signals. Such signals may be from a plurality of communication devices. For example, the first communication device may communicate with a plurality of other devices, or other devices not including the first communication device may all be communicating a multiple number of times within the observation platform. Process 1400 may occur for a single signal or a plurality of signals.

At 1604, the audible source of the at least one signal is converted to text. Well known techniques may be employed for such a conversion. The audible portion of the signal may be described as the message portion of the signal.

At 1606, the text is stored in a database. The data base may be part of the computer system or may be stored in another location accessible by the computer system. In one embodiment the data base is a MySQL data base.

At 1608, a request is received, at the computer system, for a report based on the plurality of communication signals. For example, a manager in a retail setting may request reports regarding communications of associates in the retail setting. The request may be for all communications involving a particular user. Or a request may be for all communications involving key phrases. For example, algorithms may be used to mine the text for the key phrase. A key phrase may be "lumber" and all communications involving the phrase "lumber" would then be included in the report. Automatic reports may be generated based on parameters established within the observation platform. Alternatively, the request may be sent to a hardware device associated with the observation platform other than the computer system that has access to the database.

At 1610, the report is generated based on the text. The report may be generated at the computer system and may be displayed at the computer system and may be sent to another device.

It should be appreciated that processes 300, 400, 500, 600, 700, 800, 900, 1000, 1100, 1200, 1300, 1400, 1500 and 1600 need not carry out each of the described steps to complete its operation. Nor do the steps need to be carried out in the order described. It should be appreciated that processes 300, 400, 500, 600, 700, 800, 900, 1000, 1100, 1200, 1300, 1400, 1500 and 1600, or portions thereof, may be combined with one another using any number of combination. For example, the response from the computer system in process 800 may take place in 900, 1000, 1100 and 1200.

FIG. 17 is a flowchart illustrating process 1700 for using structured communications in an observation platform with cloud computing in accordance with one embodiment of the present technology. Process 1700 may also be described as disciplining communications in an observation platform with cloud computing. In one embodiment, process 1700 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1700 is performed by the components of FIG. 1A, 1B, 1C, 1D, 1E or 2. In one embodiment, the methods may reside in a computer usable storage medium having instructions embodied therein that when executed cause a computer system to perform the method.

At 1702, a signal is received from a first communication device at a second communication device associated with a first computer system. For example device 105, computer 120, and radio base station 115 of FIG. 1E may be the first communication device, the first computer system and the second communication device respectively.

At 1704, the signal is forwarded from the first computer system to a second computer system, wherein the second computer system is physically remote from the first computer system and connected via a network. For example, the second computer system and the first computer system may be located at different physical addresses and are not within radio range of one another. The second computer system may be one or more of computers 192, 193, 194, and 195 of FIG. 1E.

At 1706, context information is derived for the signal and at least one destination for the signal based on the context information at the second computer system. The context information may be metadata, tags, or attributes as described for FIG. 1D. In one embodiment, the at least one destination is a device or a plurality of devices. For example, the destination may be device 110 or both devices 110 and 131 of FIG. 1E.

At 1708, the context information and the at least one destination for the signal are received at the first computer system.

At 1710, the signal is relayed to the at least one destination via the first computer system and the second communication device. This step may occur if the destination device is within radio range of the second communication device such as radio base station relaying the signal to device 110. In one embodiment, the signal is relayed to a destination device outside of region 175 via a second observation platform or may be relayed by one of computers 192, 193, 194, and 195 to device 131. In one embodiment, computers 192, 193, 194, and 195 may function simultaneously as part a plurality of observation platforms.

In one embodiment, the derived context information is a message to technical support and the destination is a technical support center. The technical support center may respond with corrective action. The corrective action may or may not include an audible voice component.

In one embodiment, the destination device responds to the signal. The response may be a communication transmitted in the form or a second signal. The response is then sent to the first communication device. The response may be analyzed and relayed by the observation platform or may be sent directly to the first communication. In one embodiment, after an initial response is made to the first communication device, all subsequent communications from the first communication and the destination device are sent directly to one another without computer analysis, intervention, or relaying.

FIG. 18 is a flowchart illustrating process 1800 for receiving technical support in an observation platform in accordance with one embodiment of the present technology. In one embodiment, process 1800 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 1800 is performed by the components of FIG. 1A, 1B, 1C, 1D, 1E or 2. In one embodiment, the methods may reside in a computer usable storage medium having instructions embodied therein that when executed cause a computer system to perform the method.

At 1802, a signal is received from a first communication device at a second communication device associated with a computer system, wherein the signal is a request for technical support. For example, the first communication device may be device 105 of FIG. 1C and the second communication device may be radio base station 115 of FIG. 1C.

At 1804, the request for the technical support is derived from the signal at the computer system. Such a request may be derived from the content of the signal. For example, the signal may comprise an audible portion that is converted by the computer system from speech-to-text. The text is then analyzed for key phrases such as "message to technical support" or "technical support." In one embodiment, the request for technical support is derived from metadata associated with the signal. The metadata may be generated by the first communication device or the computer system.

At 1806, the signal is relayed to a technical support destination via the computer system and the second communication device. The technical support destination may be physically proximate or remote to the first and second communication devices. In one embodiment, the first and second communication devices are associated with a first observation platform and the technical support destination is associated with a second observation platform. For example, the first observation platform may be region 175 and the second observation platform may be region 176 of FIG. 1C. In one embodiment, the first observation platform is associated with a retail environment and the second observation platform is associated with a third party not affiliated with the retail environment. The request for technical support may be a request related to the use and function of the first communication device itself or another communication device.

In one embodiment, the technical support destination sends a response to the request for technical support. The response may include an audible message to play on the first communication device, the response may be corrective action sent to the first communication device. The corrective action may be commands sent to an operating system executing at the first communication device. The corrective action may occur without the user of the first communication device being aware that the corrective action occurred. The response may be sent directly from the technical support destination or may be relayed through the computer system and second communication device.

Example Computer System Environment

Portions of the present technology are composed of computer-readable and computer-executable instructions that reside, for example, in computer-usable media of a computer system or other user device. Described below is an example computer system or components that may be used for or in conjunction with aspects of the present technology.

It is appreciated that that the present technology can operate on or within a number of different computer systems including general purpose networked computer systems, embedded computer systems, cloud-based computers, routers, switches, server devices, user devices, various intermediate devices/artifacts, stand-alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An observation platform comprising:
 a computer system;
 a first communication device associated with a first user;
 a second communication device associated with and communicatively coupled with the computer system; and
 a plurality of additional communication devices, where each of the plurality of additional communication devices is associated with a different user of a plurality of additional users; and
 wherein the computer system is configured to communicate with the first communication device and the plurality of additional communication devices via the second communication device and is further configured to:
  receive, via the second communication device, a signal from the first communication device, wherein a characteristic of the signal corresponds to an audible source, the audible source being a voice of the first user;
  derive context information at least in part from a speech to text analysis of the characteristic that corresponds to the audible source, wherein the context information comprises a verbal command issued by the first user to the computer system;
  based on the verbal command, select, by the computer system, a group of users of the plurality of additional users; and
  relay the signal, via the second communication device, to communication devices associated with the group of users.

2. The observation platform of claim 1, wherein the speech comprises a communication phrase and the verbal command directs the computer system to: select the group to include only a subset of the plurality of additional users who are noted by the computer system as experts on a topic derived from the communication phrase.

3. The observation platform of claim 2, wherein the communication phrase comprises:
 a question received as a spoken string of words.

4. The observation platform of claim 1, wherein the speech comprises a communication phrase and the verbal command directs the computer system to:
- select the group to include only selected users, of the plurality of additional users, based on the communication phrase, enterprise policy, and user context; and
- connect the selected users in a group conversation.

5. The observation platform of claim 1, wherein the speech comprises a communication phrase and the verbal command directs the computer system to:
- select the group to include only users, of the plurality of additional users, based on the communication phrase, enterprise policy and user context; and
- wherein the relay the signal comprises relaying of the signal to the group as a message that persists for a predetermined interval.

6. The observation platform of claim 1, wherein the speech comprises a communication phrase and the verbal command directs the computer system to: select the group to include only a subset of the plurality of additional users who are in one of: a location described by content of the communication phrase; and a target location specified by a combination of enterprise policy and user context.

7. The observation platform of claim 1, wherein the speech comprises a communication phrase and the verbal command triggers the computer system to:
- initiate a translation of the communication phrase from speech to information in a machine readable format; and
- deliver the information in the machine readable format to one of an expert system and a knowledgebase for a machine response to the communication phrase.

8. The observation platform of claim 1, wherein the speech comprises a communication phrase and the verbal command directs the computer system to:
- select the group for appropriate response to the communication phrase; and
- responsive to a member of the selected group may then indicating to the observation platform that they are responding to the communication, eliminate any requirement for other members of the selected group to respond to the communication.

9. The observation platform of claim 1, wherein the speech comprises a communication phrase and the verbal command directs the computer system to:
- select the group for appropriate response from within one of the observation platform and a second observation platform, wherein the second observation platform is in a different geographic location from the observation platform.

10. A method of communication in an observation platform, the observation platform comprising a computer system, a first communication device associated with a first user, a second communication device associated with and communicatively coupled with the computer system, and a plurality of additional communication devices each associated with a different user of a plurality of additional users, the method comprising:
- receiving, by the computer system via the second communication device, a signal from the first communication device, wherein a characteristic of the signal corresponds to an audible source, the audible source being a voice of the first user;
- deriving, by the computer system, context information at least in part from a speech to text analysis of the characteristic that corresponds to the audible source, wherein the context information comprises a verbal command issued by the first user to the computer system;
- based on the verbal command, selecting, by the computer system, a group of users of the plurality of additional users; and
- relaying the signal, by the computer system via the second communication device, to communication devices associated with the group of users.

11. The method as recited in claim 10, wherein the selecting the group of users of the plurality of additional users comprises:
- selecting the group to include only a subset of the plurality of additional users who are noted by the computer system as experts on a topic derived from the voice of the first user.

12. The method as recited in claim 10, wherein the selecting the group of users of the plurality of additional users comprises:
- selecting the group to include all the plurality of additional users.

13. The method as recited in claim 10, wherein the signal comprises a communication phrase and wherein the selecting the group of users of the plurality of additional users comprises:
- directing, based on the verbal command, the computer system to select the group to include only a subset of the plurality of additional users who are in a location described by content of the communication phrase.

14. The method as recited in claim 10, wherein the selecting the group of users of the plurality of additional users comprises:
- selecting the group to consist of a single user, of the plurality of additional users, identified by name in the voice of the first user.

15. The method as recited in claim 10, wherein the relaying the signal comprises:
- relaying the signal to the group as a message that persists for a predetermined interval.

16. The method as recited in claim 10, wherein the relaying the signal comprises:
- interrupting, with the relayed signal, any user of the group of users who indicate they are engaged or are engaged in other communication on the observation platform.

17. A non-transitory computer-usable storage medium having instructions embodied therein that when executed cause a computer system of an observation platform to perform a method of communication, the observation platform comprising the computer system, a first communication device associated with a first user, a second communication device associated with and communicatively coupled with the computer system, and a plurality of additional communication devices each associated with a different user of a plurality of additional users, and the method comprising:
- receiving, by the computer system via the second communication device, a signal from the first communication device, wherein a characteristic of the signal corresponds to an audible source, the audible source being a voice of the first user;
- deriving, by the computer system, context information at least in part from a speech to text analysis of the characteristic that corresponds to the audible source, wherein the context information comprises a verbal command issued by the first user to the computer system;

based on the verbal command, selecting, by the computer system, a group of users of the plurality of additional users; and relaying the signal, by the computer system via the second communication device, to communication devices associated with the group of users.

18. The non-transitory computer-usable storage medium as recited in claim 17, wherein the selecting the group of users of the plurality of additional users comprises:

selecting the group to include only a subset of the plurality of additional users who are noted by the computer system as experts on a topic derived from the voice of the first user.

19. The non-transitory computer-usable storage medium as recited in claim 17, wherein the selecting the group of users of the plurality of additional users comprises:

selecting the group to include all the plurality of additional users.

20. The non-transitory computer-usable storage medium as recited in claim 17, wherein the selecting the group of users of the plurality of additional users comprises:

selecting the group to include only a subset of the plurality of additional users who are in a location described in the voice of the first user.

21. The non-transitory computer-usable storage medium as recited in claim 17, wherein the selecting the group of users of the plurality of additional users comprises:

selecting the group to consist of a single user, of the plurality of additional users, identified by name in the voice of the first user.

22. The non-transitory computer-usable storage medium as recited in claim 17, wherein the relaying the signal comprises:

relaying the signal to the group as a message that persists for a predetermined interval.

23. The non-transitory computer-usable storage medium as recited in claim 17, wherein the relaying the signal comprises:

interrupting, with the relayed signal, any user of the group of users engaged in other communication on the observation platform.

* * * * *

UNITED STATES PATENT AND TRADEMARK OFFICE
CERTIFICATE OF CORRECTION

PATENT NO. : 11,128,565 B2  
APPLICATION NO. : 16/738841  
DATED : September 21, 2021  
INVENTOR(S) : VanBuskirk et al.

Page 1 of 1

It is certified that error appears in the above-identified patent and that said Letters Patent is hereby corrected as shown below:

On the Title Page

Page 2, Column 1, Related U.S. Application Data, Lines 6 - 10:

Delete: "filed on Feb. 21, 2012, now Pat. No. 8,948,730, and a continuation-in-part of application No. 13,665,527, filed on Oct. 31, 2012, now abandoned, and a con-" tinuation-in-part of application No. 13,739,504, filed on Jan. 11, 2013, now Pat. No. 10,204,524."

Insert: --filed on Feb. 21, 2012, now Pat. No, 8,948,730, said application No. 15/207,118 is a continuation-in-part of application No. 13/665,527, filed on Oct. 31, 2012, now abandoned, and a continuation-in-part of application No. 13,739,504, filed on Jan. 11, 2013, now Pat. No. 10,204,524.--

Signed and Sealed this  
Twenty-eighth Day of June, 2022

Katherine Kelly Vidal  
*Director of the United States Patent and Trademark Office*